(12) United States Patent
Tan et al.

(10) Patent No.: US 11,531,861 B2
(45) Date of Patent: Dec. 20, 2022

(54) NEURAL ARCHITECTURE SEARCH WITH FACTORIZED HIERARCHICAL SEARCH SPACE

(71) Applicant: Google LLC, Mountain View, CA (US)

(72) Inventors: Mingxing Tan, Newark, CA (US); Quoc Le, Sunnyvale, CA (US); Bo Chen, Pasadena, CA (US); Vijay Vasudevan, Los Altos Hills, CA (US); Ruoming Pang, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 870 days.

(21) Appl. No.: 16/258,927

(22) Filed: Jan. 28, 2019

(65) Prior Publication Data

US 2020/0143227 A1     May 7, 2020

Related U.S. Application Data

(60) Provisional application No. 62/756,254, filed on Nov. 6, 2018.

(51) Int. Cl.
*G06N 3/04*     (2006.01)
*G06N 20/10*     (2019.01)
(Continued)

(52) U.S. Cl.
CPC .............. *G06N 3/04* (2013.01); *G06F 17/15* (2013.01); *G06N 3/0445* (2013.01); *G06N 3/084* (2013.01); *G06N 20/10* (2019.01); *G06N 3/0454* (2013.01)

(58) Field of Classification Search
CPC ........ G06N 20/00; G06N 20/10; G06N 20/20; G06N 3/02; G06N 3/04; G06N 3/0445;
(Continued)

(56) References Cited

U.S. PATENT DOCUMENTS 8,682,820 B2    3/2014    Robinson et al.
9,729,639 B2    8/2017    Sustaeta et al.
(Continued)

OTHER PUBLICATIONS

Baker et al., "Designing Neural Network Architectures Using Reinforcement Learning", arXiv:1611.02167v3, Mar. 22, 2017, 18 pages.

(Continued)

*Primary Examiner* — Shane D Woolwine
(74) *Attorney, Agent, or Firm* — Dority & Manning, P.A.

(57) ABSTRACT

The present disclosure is directed to an automated neural architecture search approach for designing new neural network architectures such as, for example, resource-constrained mobile CNN models. In particular, the present disclosure provides systems and methods to perform neural architecture search using a novel factorized hierarchical search space that permits layer diversity throughout the network, thereby striking the right balance between flexibility and search space size. The resulting neural architectures are able to be run relatively faster and using relatively fewer computing resources (e.g., less processing power, less memory usage, less power consumption, etc.), all while remaining competitive with or even exceeding the performance (e.g., accuracy) of current state-of-the-art mobile-optimized models.

19 Claims, 12 Drawing Sheets

(51) Int. Cl.
G06F 17/15 (2006.01)
G06N 3/08 (2006.01)
(58) Field of Classification Search
CPC ........ G06N 3/0454; G06N 3/08; G06N 3/084; G06F 17/15
See application file for complete search history.

(56) References Cited

U.S. PATENT DOCUMENTS

2014/0143193 A1    5/2014  Zheng et al.
2020/0065961 A1*   2/2020  Zhao ..................... G06T 7/0004
2020/0327367 A1*  10/2020  Ma ....................... G06K 9/00791

OTHER PUBLICATIONS

Cai et al., "Reinforcement Learning for Architecture Search by Network Transformation", arXiv:1707.04873v1, Jul. 16, 2017, 10 pages.
Dong et al., "DPP-Net: Device-Aware Progressive Search for Pareto-Optimal Neural Architectures", arXiv:1806.08198v2, Jul. 25, 2018, 15 pages.
Dong et al., "PPP-Net: Platform-Aware Progressive Search for Pareto-Optimal Neural Architectures", International Conference on Learning Representations Workshop, Vancouver, Canada, Apr. 30-May 3, 2018, 4 pages.
Elsken et al., "Efficient Multi-Objective Neural Architecture Search via Lamarckian Evolution", arXiv:1804.09081v3, Dec. 22, 2018, 23 pages.
Elsken et al., "Multi-Objective Architecture Search for CNNs", arXIV:1804.09081v3, Dec. 22, 2018, 23 pages.
Gholami et al., "SqueezeNext: Hardware-Aware Neural Network Design", arXiv:1803.10615v2, Aug. 27, 2018, 12 pages.
Gordon et al., "Morphnet: Fast & Simple Resource-Constrained Structure Learning of Deep Networks", arXiv:1711.06798v3, Apr. 17, 2018, 15 pages.
Goyal et al., "Accurate, Large Minibatch SGD: Training Imagenet in 1 Hour", arXiv:1706.02677v2, Apr. 30, 2018, 12 pages.
Han et al., "Deep Compression: Compressing Deep Neural Networks with Pruning Trained Quantization and Huffman Coding", arXiv:1510.00149v5, Feb. 15, 2016, 14 pages.
He et al., "Deep Residual Learning for Image Recognition", Computer Vision and Pattern Recognition, Las Vegas, Nevada, Jun. 26-Jul. 1, 2016, pp. 770-778.
Howard et al., "MobileNets: Efficient Convolutional Neural Networks for Mobile Vision Applications", arXiv:1704.04861v1, Apr. 17, 2017, 9 pages.
Hsu et al., "MONAS: Multi-Objective Neural Architecture Search Using Reinforcement Learning", arXiv:1806.10332v1, Jun. 27, 2018, 8 pages.
Hu et al., "Squeeze-and-Excitation Networks", arXiv:1709.01507v3, Oct. 25, 2018, 14 pages.
Huang et al., "CondenseNet: An Efficient DenseNet Using Learned Group Convolutions", arXiv:1711.09224v2, Jun. 7, 2018, 10 pages.
Iandola et al., "SqueezeNet: Alex Net-Level Accuracy with 50x Fewer Parameters and <0.5 mb Model Size". arXiv:160207360v4, Nov. 4, 2016, 13 pages.
Jacob et al., "Quantization and Training of Neural Networks for Efficient Integer-Arithmetic-Only Inference", arXiv:1712.05877v1, Dec. 15, 2017, 14 pages.
Khosla et al., "Novel Dataset for Fine-Grained Image Categorization: Stanford Dogs", First Workshop on Fine-Grained Visual Categorization Computer Vision and Pattern Recognition, Colorado Springs, Colorado, Jun. 20-25, 2011, 2 pages.
Kim et al, "NEMO: Neuro-Evolution with Multiobjective Optimization of Deep Neural Network for Speed and Accuracy", Journal of Machine Learning Research: Workshop and Conference Proceedings, vol. 1, 2017, pp. 1-8.
Lin et al., Microsoft COCO: Common Objects in Context, arXiv:1405.0312v3, Feb. 21, 2015, 15 pages.
Liu et al., "DARTS: Differentiable Architecture Search", arXiv:1806.09055v1, Jun. 24, 2018, 12 pages.
Liu et al., "Hierarchical Representations for Efficient Architecture Search", arXiv:1711.00436v2, Feb. 22, 2018, 13 pages.
Liu et al., "Progressive Neural Architecture Search" arXiv:1712.00559v1, Dec. 2, 2017, 11 pages.
Liu et al., "SSD: Single Shot Multibox Detector", arXiv:1512.02325v5, Dec. 29, 2016, 17 pages.
Pham et al., "Efficient Neural Architecture Search via Parameter Sharing", arXiv:1802.03268v2, Feb. 12, 2018, 11 pages.
Real et al., "Regularized Evolution for Image Classifier Architecture Search", arXiv:1802.01548v8, Oct. 26, 2018, 16 pages.
Redmon et al., "YOLO9000: Better, Faster, Stronger", arXiv:1612.08242v1, Dec. 25, 2016, 9 pages.
Russakovsky et al., "ImageNet Large Scale Visual Recognition Challenge", arXiv:1409.0575v3, Jan. 30, 2015, 43 pages.
Sandler et al., "MobileNetV2: Inverted Residuals and Linear Bottlenecks", arXiv:1801.04381v3, Apr. 2, 2018, 14 pages.
Schulman et al., "Proximal Policy Optimization Algorithms", arXiv:1707.06347v2, Aug. 28, 2017, 12 pages.
Szegedy et al., "Inception-v4, Inception-ResNet and the Impact of Residual Connections on Learning", arXiv:1602.07261v2, Aug. 23, 2016, 12 pages.
Yang et al., "NetAdapt: Platform-Aware Neural Network Adaptation for Mobile Applications", arXiv:180403230v2, Sep. 28, 2018, 16 pages.
Zhang et al., "ShuffleNet: An Extremely Efficient Convolutional Neural Network for Mobile Devices", arxiv:1707.01083v2, Dec. 7, 2017, 9 pages.
Zhou et al., "Resource-Efficient Neural Architect, arXiv" 1806.07912v1, Jun. 12, 2018, 14 pages.
Zoph et al., "Learning Transferable Architectures for Scalable Image Recognition", arXiv:1707.07012v2, Apr. 11, 2018, 14 pages.
Zoph et al., "Neural Architecture Search with Reinforcement Learning", arXiv:1611.01578v2, Feb. 15, 2017, 16 pages.

* cited by examiner

NEURAL ARCHITECTURE SEARCH WITH FACTORIZED HIERARCHICAL SEARCH SPACE

PRIORITY CLAIM

The present application is based on and claims priority to U.S. Provisional Application No. 62/756,254 having a filing date of Nov. 6, 2018. Applicant claims priority to and the benefit of each of such application and incorporate all such application herein by reference in its entirety.

FIELD

The present disclosure relates generally to neural networks. More particularly, the present disclosure relates to neural architecture search using a novel factorized hierarchical search space that permits layer diversity throughout the network.

BACKGROUND

Artificial neural networks are a class of machine-learned models that are especially powerful, accurate, or otherwise high-performing for various tasks. An artificial neural network can include a group of connected nodes, which also can be referred to as (artificial) neurons or perceptrons. An artificial neural network can be organized into one or more layers. Artificial neural networks that include multiple layers can be referred to as "deep" networks.

Example artificial neural networks include feed-forward neural networks, recurrent neural networks, convolutional neural networks, other forms of artificial neural networks, or combinations thereof. Each of these example types has different internal structures or "architectures" that enable, in part, the particular benefits provided by that type of artificial neural network. For example, the architecture of an artificial neural network can correspond to or include the structure, arrangement, number, types, behavior, and/or other properties of the artificial neurons included in the network and also their respective edges.

As an example, convolutional neural networks (CNN) have made significant progress in image classification, object detection, and many other applications. As they have developed, state-of-the-art CNN models have often become increasingly "deeper" (i.e., have included increasing number of layers and complexity). For example, certain state-of-the-art CNNs may include hundreds if not thousands of layers. However, as state-of-the-art CNN models become increasingly deeper and larger they also become slower, and require more computation. Such increases in computational demands make it difficult to deploy state-of-the-art CNN models on resource-constrained platforms such as mobile or embedded devices.

Given restricted computational resources available on mobile devices, much recent research has focused on designing and improving mobile CNN models by reducing the depth of the network and utilizing less expensive operations, such as depthwise convolution (Howard et al. 2017) and group convolution (Zhang et al. 2018). However, designing a resource-constrained mobile model is challenging: one has to carefully balance accuracy and resource-efficiency, resulting in a significantly large search space. Further complicating matters is that each type of mobile devices has its own software and hardware idiosyncrasies and may require different architectures for the best accuracy-efficiency trade-offs.

More particularly, one developing field of study is that of neural architecture search. Neural architecture search uses the principles and techniques of machine learning to automate or "learn" the design of new artificial neural network architectures. In particular, as examples, neural architecture search techniques may seek to automate the specification and discovery of entire neural network topologies, activation functions, gradient update rules, and/or many other complex details that underlie state-of-the-art deep learning architectures. These efforts assume various names in addition to neural architecture search, including "learning to learn," "AutoML," "meta-learning," or the like.

Existing neural architecture search techniques often work by iteratively searching within a search space that defines the bounds of the search. For example, a search technique can include iteratively sampling architectures within the search space to generate new architectures. Generally, the speed with which a neural architecture search can be performed is, at least in part, a function of the size of its search space. That is, a larger search space includes a larger number of possible permutations which will take longer to search, while a smaller search space will be faster to search.

Application of neural architecture search techniques to the design of state-of-the-art neural networks (e.g., deep CNNs) has been challenging due to the large and complex nature of typical state-of-the-art neural networks. For example, as indicated above, certain state-of-the-art neural networks may include hundreds if not thousands of layers. Because there are so many layers, it is extremely computationally challenging to perform search techniques which both seek to mimic the significantly deep structure of such state-of-the-art networks while also searching on a layer-by-layer basis. Stated differently, it is computationally impractical to search for a significantly deep neural network where the search space operates on a layer-by-layer basis.

In response to this challenge, instead of searching on a layer-by-layer basis, certain existing neural architecture search techniques instead search for only a single cell structure or motif and then replicate and repeat the identified cell structure a number of times to form the network architecture. However, this approach does not allow for diversity within the network, which hampers the flexibility of the produced architectures and often renders them less suitable for use in resource-constrained environments.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method includes defining, by one more computing devices, an initial network structure for an artificial neural network. The initial network structure includes a plurality of blocks. The method includes associating, by the one or more computing devices, a plurality of sub-search spaces respectively with the plurality of blocks. The sub-search space for each block has one or more searchable parameters associated therewith. The one or more searchable parameters included in the sub-search space associated with at least one of the plurality of blocks include a number of layers included in the block. The method includes, for each of one or more iterations: modifying, by one or more computing devices, at least one of the searchable parameters in the sub-search space associated with at least one of the plurality of blocks to generate a new network structure for the artificial neural network.

Another example aspect of the present disclosure is directed to a computing system that includes one or more processors and one or more non-transitory computer-readable media that store instructions that, when executed by the one or more processors, cause the computing system to perform operations. The operations include defining an initial network structure for an artificial neural network. The initial network structure includes a plurality of blocks. A plurality of sub-search spaces are respectively associated with the plurality of blocks. The sub-search space for each block has one or more searchable parameters associated therewith. The operations include, for each of a plurality of iterations: modifying at least one of the searchable parameters in the sub-search space associated with at least one of the plurality of blocks to generate a new network structure for the artificial neural network.

Another example aspect of the present disclosure is directed to one or more non-transitory computer-readable media that store instructions that, when executed by one or more processors of a computing system, cause the computing system to perform operations. The operations include defining, by one or more computing devices, an initial network structure for an artificial neural network. The initial structure includes a plurality of blocks. A plurality of sub-search spaces are respectively associated with the plurality of blocks. The sub-search space for each block has a plurality of searchable parameters associated therewith. The plurality of searchable parameters for each block includes at least a number of identical layers included in the block and an operation to be performed by each of the number of identical layers included in the block. The operations include, for each of a plurality of iterations: modifying, by one or more computing devices, at least one of the searchable parameters in the sub-search space associated with at least one of the plurality of blocks to generate a new network structure for the artificial neural network, wherein the number of identical layers included in at least one of the plurality of blocks includes two or more identical layers.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
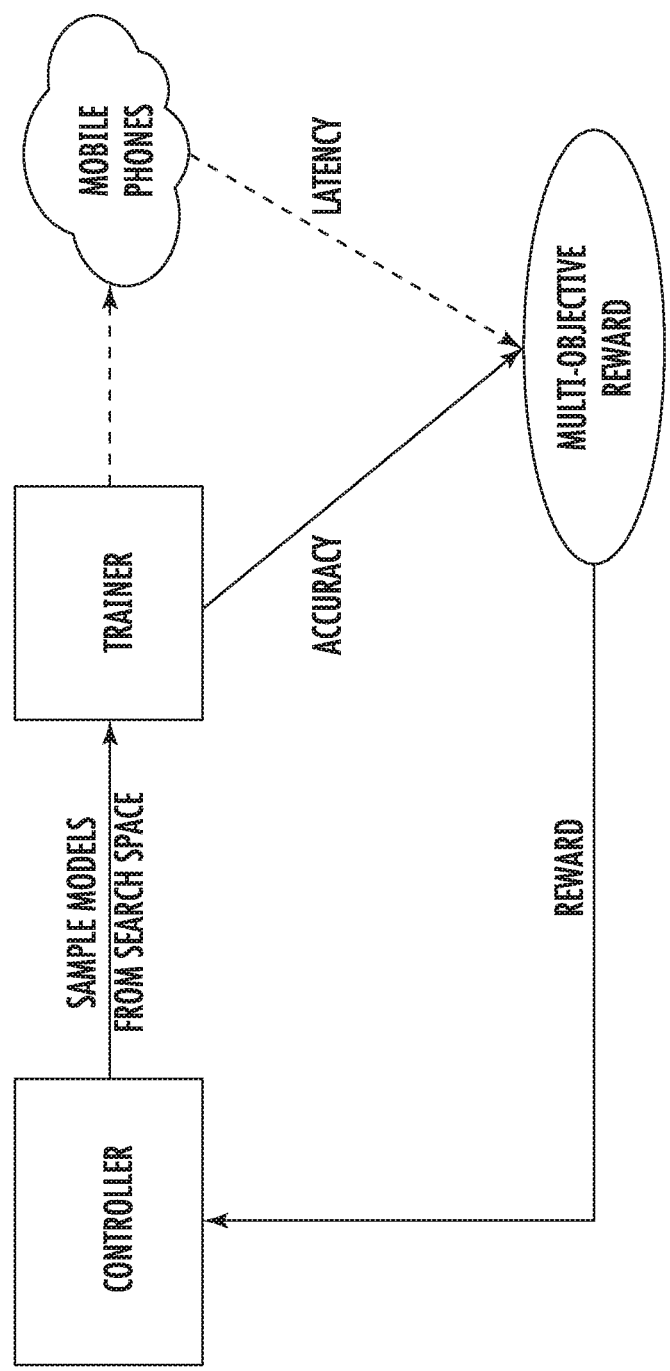
FIG. 1 depicts a graphical diagram of an example neural architecture search approach according to example embodiments of the present disclosure.

Reference numerals that are repeated across plural figures are intended to identify the same features in various implementations.

DETAILED DESCRIPTION

Overview

Generally, the present disclosure is directed to an automated neural architecture search approach for designing new neural network architectures such as, for example, resource-constrained mobile CNN models. In particular, the present disclosure provides systems and methods that perform neural architecture search using a novel factorized hierarchical search space that permits layer diversity throughout the network, thereby striking a balance between flexibility and search space size. As a result, the systems and methods of the present disclosure are able to generate new neural architectures much faster and using much fewer computing resources (e.g., less processing power, less memory usage, less power consumption, etc.), for example as compared to layer-by-layer search techniques. As another result, the systems and methods of the present disclosure are able to generate new neural architectures that are more well suited for resource-constrained environments, for example as compared to search techniques which naively repeat a single motif or cell structure. That is, the resulting neural architectures are able to be run relatively faster and using relatively fewer computing resources (e.g., less processing power, less memory usage, less power consumption, etc.), all while remaining competitive with or even exceeding the performance (e.g., accuracy) of current state-of-the-art mobile-optimized models.

More particularly, in some implementations, a search system can define an initial network structure that includes a plurality of blocks. A plurality of sub-search spaces can be respectively associated with the plurality of blocks. The sub-search space for each block can have one or more searchable parameters associated therewith. As examples, the searchable parameters included in the sub-search space associated with each block can include: a number of layers included in the block; an operation to be performed by each of the number of layers included in the block; a kernel size; a skip operation to be performed; an input size; and/or an output filter size. Furthermore, in some implementations, the layers within each block can be identical. That is, for each block, the parameter values selected for the parameters of such block for a given architecture can be uniformly applied to the number of identical layers included in such block.

As such, the search space described herein can be referred to as a factorized hierarchical search space. For example, the search space can be referred to as "factorized" because the generated network structures are partitioned into blocks or groups of layers with similar layers (e.g., the same operation, input size, filter shape, etc.). As recognized by the present disclosure, layers with the same input size and/or filter shape will often show similar performance. The search space can be referred to as "hierarchical" because it operates at different hierarchical levels. For example, a first level can include the plurality of blocks, a second level can include the number of layers included within a block, and a third level can include the characteristics within each layer of the number of layers.

To perform the neural architecture search within the defined search space, the search system can iteratively search within the sub-search spaces to identify new neural architectures. In particular, in some implementations, the plurality of sub-search spaces can be independent from each other such that modification of at least one of the searchable parameters in one of the sub-search spaces does not necessitate modification of the searchable parameters of any other of the sub-search spaces. The use of multiple independent sub-search spaces permits diversity throughout the network (e.g., diversity of layer numbers, operation types, input sizes, filter sizes, etc.). This is in contrast to techniques which do not allow for layer diversity (e.g., techniques that simply replicate a single cell), which hampers the flexibility of the produced architectures and often renders them less suitable for use in resource-constrained environments.

In particular, state-of-the-art models often exhibit characteristics such as the use of more complex operations earlier in the network and the use of simpler operations later in the network; decreasing input size as the network progresses; and increasing filter size as the network progresses. However, certain existing search approaches (e.g., those which simply replicate a single cell structure) do not allow for depth-specific variance in input size or filter size and, as a result, the network structures they generate do not mimic these patterns exhibited by state-of-the-art networks. The search space described herein, however, does permit diversity of these parameters (e.g., input size and filter size) and, as a result, the generated network structures are able to better produce high performing models. This is particularly important when searching for or designing networks to be used in resource-constrained environments, as the latency in executing a layer is, at least in part, a function of the input size, filter size, and operation being performed. By enabling each block to independently search for these parameters, the search techniques and spaces described herein enable different operations to be applied to different inputs sizes and/or filter sizes, thereby enabling identification of optimal combinations of these parameters at different stages of the network and for various objectives, including, for example, a balance between latency and accuracy.

Thus, at each of a plurality of iterations, the search system can modify at least one of the searchable parameters in the sub-search space associated with at least one of the plurality of blocks to generate one or more new network structures for an artificial neural network. For example, the modifications can be guided by a controller (e.g., a recurrent neural network-based controller) or can be random (e.g., random evolutionary mutations).

In some implementations, the search system can measure one or more performance characteristics of the new network structures for the artificial neural network. The search system can use the measured performance characteristics to, for example, determine whether to keep or discard the new network structure (e.g., through comparison to performance characteristics of a best-previously-observed structure). Additionally or alternatively, the search system can use the measured performance characteristics to determine a reward to provide to the controller in a reinforcement learning scheme and/or other measurements of loss, reward, regret, and/or the like (e.g., for use in gradient-based optimization schemes). As an example, the measured performance characteristics can include an accuracy (or an estimated accuracy) of the network structure as trained for and evaluated on a particular training dataset and/or prediction task.

According to another aspect, in some implementations, the measured performance characteristics can include a real-world latency associated with implementation of the new network structure on a real-world mobile device. More particularly, in some implementations, the search system can explicitly incorporate latency information into the main objective so that the search can identify a model that achieves a good trade-off between accuracy and latency. Unlike in previous work, where mobile latency is considered via another, often inaccurate proxy (e.g., FLOPS), in some implementations, real-world inference latency can be directly measured by executing the model on a particular platform (e.g., a mobile device such as the Google Pixel device). In further implementations, various other performance characteristics can be included in a multi-objective function that guides the search process, including, as examples, power consumption, user interface responsiveness, peak compute requirements, and/or other characteristics of the generated network structures.

The present disclosure also includes example experimental results which show that example implementations of the present disclosure generate new network architectures that are able to consistently outperform state-of-the-art mobile CNN models across multiple vision tasks. As one example, on the ImageNet classification task, an example model generated using the search techniques described herein achieves 74.0% top-1 accuracy with 76 ms latency on a Pixel phone, which is 1.5× faster than MobileNetV2 (Sandler et al. 2018) and 2.4× faster than NASNet (Zoph et al. 2018) with the same top-1 accuracy. On the other hand, changing from a focus on latency to accuracy, compared to the recent MobileNetV2, the example model improves the ImageNet top-1 accuracy by 2% with the same latency on Pixel phone. With the additional squeeze-and-excitation optimization (Hu, Shen, and Sun 2018), the approach described herein achieves ResNet-50 (He at al. 2016) level top-1 accuracy at 76.13%, with 19× fewer parameters and 10× fewer multiply-add operations. The generated models also generalize well with different model scaling techniques (e.g., varying input image sizes), consistently improving ImageNet top-1 accuracy by about 2% over MobileNetV2. On the COCO object detection task, a family of example models generated using the search techniques described herein achieves both higher mAP quality and lower latency than MobileNets and achieves comparable mAP quality (22.9 vs 23.2) as SSD300 (Liu et al. 2016) with 35× less computational cost.

Thus, the present disclosure: proposes a novel factorized hierarchical search space to maximize the on-device resource efficiency of mobile models, by striking the right balance between flexibility and search space size; introduces a multi-objective neural architecture search approach based on reinforcement learning, which is capable of finding high accuracy CNN models with low real-world inference latency; and show significant and consistent improvements over state-of-the-art mobile CNN models on both ImageNet classification and COCO object detection.

The present disclosure provides a number of technical effects and benefits. As one example, the systems and methods of the present disclosure are able to generate new neural architectures much faster and using much fewer computing resources (e.g., less processing power, less memory usage, less power consumption, etc.), for example as compared to layer-by-layer search techniques. As another result, the systems and methods of the present disclosure are able to generate new neural architectures that are better suited for resource-constrained environments, for example as compared to search techniques which naively repeat a single motif or cell structure. That is, the resulting neural architectures are able to be run relatively faster and using relatively fewer computing resources (e.g., less processing power, less memory usage, less power consumption, etc.), all while remaining competitive with or even exceeding the performance (e.g., accuracy) of current state-of-the-art mobile-optimized models. Thus, as another example technical effect and benefit, the search technique described herein can automatically find significantly better mobile models than existing approaches, and achieve new state-of-the-art results (e.g., as demonstrated on both ImageNet classification and COCO object detection under typical mobile inference latency constraints).

With reference now to the Figures, example embodiments of the present disclosure will be discussed in further detail.

Example Problem Formulation and Approach

In some implementations of the present disclosure, the design problem can be formulated as a multi-objective search, aiming at finding models (e.g., CNN models) with both high-accuracy and low inference latency. Unlike previous work which optimizes for indirect metrics such as FLOPS or number of parameters, example implementations of the present disclosure consider direct real-world inference latency, by running the generated models (e.g., CNN models) on real mobile devices and then incorporating the real-world inference latency into the objective. Doing so directly measures what is achievable in practice: early experiments on proxy inference metrics, including single-core Desktop CPU latency and simulated cost models, show it is challenging to approximate real-world latency due to the variety of mobile hardware/software configurations.

More particularly, FIG. 1 shows a graphical diagram of one example approach that can be used to implement the concepts described herein, where some differences from previous approaches are the latency-aware multi-objective reward and use of the novel search space. The example approach illustrated in FIG. 1 is inspired by two main ideas. First, the design problem can be formulated as a multi-objective optimization problem that considers both accuracy and inference latency of generated models. Next, the architecture search can be used in combination with reinforcement learning to find the model that achieves the best trade-off between accuracy and latency. Secondly, the present disclosure recognizes that previous automated approaches mainly search for a few types of cells and then repeatedly stack the same cells through the CNN network. Those searched models do not take into account that operations like convolution greatly differ in latency based on the concrete shapes they operate on: for instance, two 3×3 convolutions with the same number of theoretical FLOPS but different shapes may not have the same runtime latency. Based on this observation, the present disclosure proposes a factorized hierarchical search space that can include, in some implementations, of a sequence of factorized blocks, each block containing a list of layers defined by a hierarchical sub search space with different convolution operations and connections. The present disclosure demonstrates that different operations should be used at different depths of an architecture. Further, searching among this large space of options can, in some implementations, effectively be done using architecture search methods that use measured inference latency as part of the reward signal.

Referring again to example approach illustrated in FIG. 1, given a model m, let ACC(m) denote the given model's accuracy on the target task, LAT(m) denotes the inference latency on the target mobile platform, and T is the target latency. One possible method is to treat T as a hard constraint and maximize accuracy under this constraint:

$$\underset{m}{\text{maximize}} \quad ACC(m) \qquad (1)$$
$$\text{subject to} \quad LAT(m) \leq T$$

However, this approach only maximizes a single metric and does not provide multiple Pareto optimal solutions. Informally, a model is called Pareto optimal if either it has the highest accuracy without increasing latency or it has the lowest latency without decreasing accuracy. Given the computational cost of performing architecture search, example implementations of the present disclosure focus more on finding multiple Pareto-optimal solutions in a single architecture search.

In some implementations, the present disclosure utilizes a customized weighted product method to approximate Pareto optimal solutions, by setting the optimization goal as:

$$\underset{m}{\text{maximize}} \quad ACC(m) \times \left[\frac{LAT(m)}{T}\right]^w \qquad (2)$$

where w is the weight factor defined as:

$$w = \begin{cases} \alpha, & \text{if } LAT(m) \leq T \\ \beta, & \text{otherwise} \end{cases} \qquad (3)$$

where $\alpha$ and $\beta$ are application-specific constants. An empirical rule for picking $\alpha$ and $\beta$ is to check how much accuracy gain or loss is expected if the latency is doubled or halved. For example, doubling or halving the latency of Mobile-NetV2 brings about 5% accuracy gain or loss, so the constraints, $\alpha$ and $\beta$, can be empirically set $\alpha=\beta=-0.07$, since $2^{-0.07}-1 \approx 1-0.5^{-0.07} \approx 5\%$. By setting ($\alpha,\beta$) in this way, equation (2) can effectively approximate Pareto solutions nearby the target latency T. While the weighted product method is easy to customize, other methods like weighted sum can also be used by other example implementations.

Figure 2A:
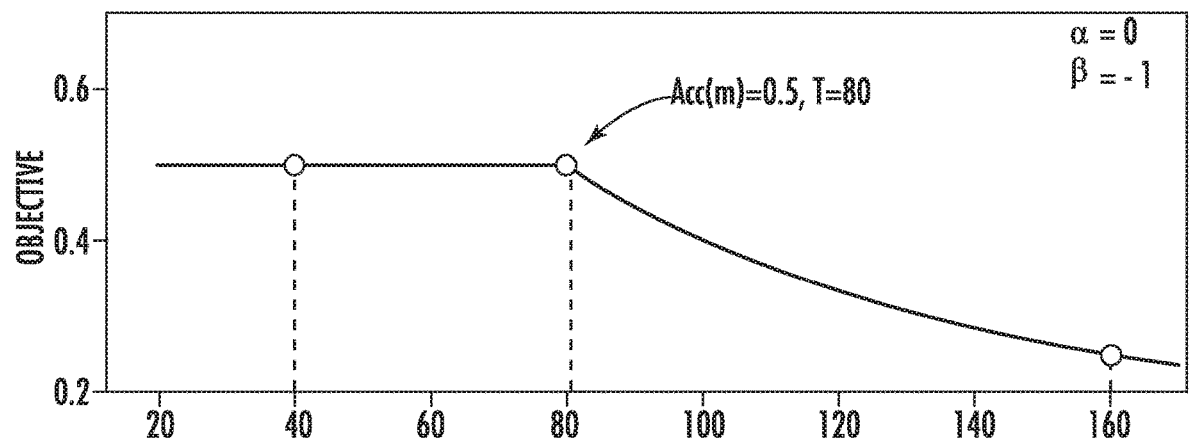
FIGS. 2A and 2B depict example plots of an objective function according to example embodiments of the present disclosure.
Figure 2B:
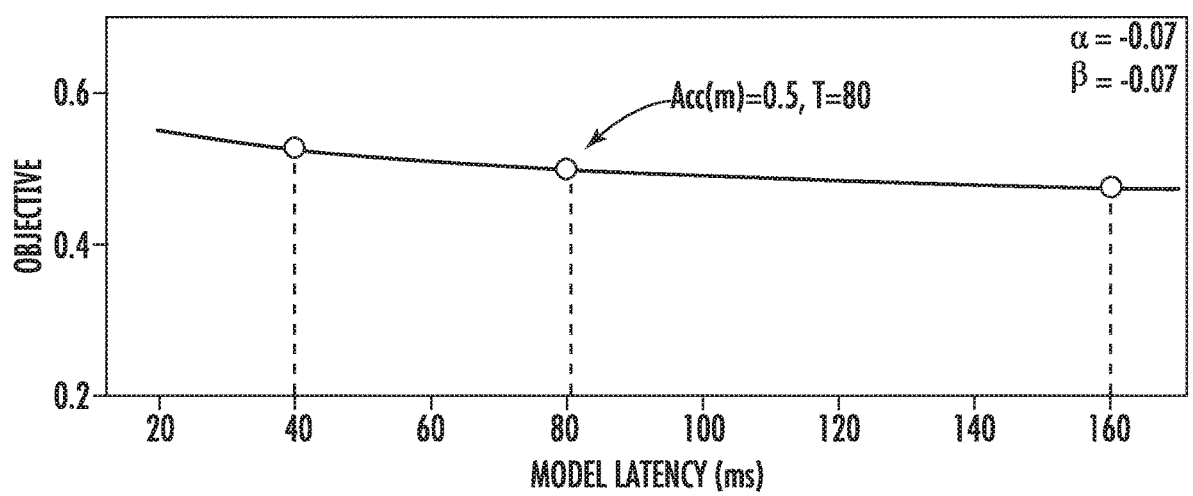

FIGS. 2A and 2B show plots of an example objective function with two typical values of $(\alpha,\beta)$. In FIG. 2A with $(\alpha=0, \beta=-1)$, accuracy is simply used as the objective value if measured latency is less than the target latency T; otherwise, the objective value is sharply penalized to discourage models from violating latency constraints. In FIG. 2B $(\alpha=\beta=-0.07)$ the objective function treats the target latency T as a soft constraint, and smoothly adjusts the objective value based on the measured latency. In some implementations of the present disclosure, the application-specific constraints, $\alpha$ and $\beta$, are set to $\alpha=\beta=-0.07$ in order to obtain multiple Pareto optimal models in a single search experiment. In some implementations, reward functions may dynamically adapt to the Pareto curve.

Although example implementations which use multi-objective formulations are discussed in detail herein, the present disclosure is not limited to use of multi-objective formulations. For example, use of the latency information in performing the search (e.g., as illustrated in FIG. 1) is optional. In some implementations, the reward signal or other objective measure can be based on accuracy alone, while in other implementations, the reward signal or other objective measure can be based on various combinations of objectives which may or may not include a latency objective. Example additional objectives that can optionally be used in a multi-objective formulation include power usage, user interface responsiveness, peak compute requirements, memory usage requirements, and/or various other performance parameters or characteristics.

Example Neural Architecture Search

Example Search Algorithm

Example implementations of the present disclosure employ a gradient-based reinforcement learning approach to find solutions (e.g., Pareto optimal solutions) for a search problem (e.g., a multi-objective search problem). Reinforcement learning can be used because it is convenient and the reward is easy to customize. However, in other implementations, other search algorithms like evolutionary algorithms can be used instead. For example, new architectures can be generated through randomized mutation rather than according to tokens as described below.

More particularly, example implementations of the present disclosure can map each model (e.g., CNN model) in the search space to a list of tokens. These tokens can be determined by a sequence of actions $a_{i:T}$ from the reinforcement learning agent based on its parameters $\theta$. One goal is to maximize the expected reward:

$$J = E_{P(a_{i:T};\theta)}[R(m)] \qquad (4)$$

where m is a sampled model uniquely determined by action $a_{1:T}$, and R(m) is the objective value defined by equation (2).

Referring again to FIG. 1, one example search framework consists of three components: a controller (e.g., a recurrent neural network (RNN) based controller), a trainer to obtain the model accuracy, and a mobile phone-based inference engine for measuring the latency. The framework can use a sample-eval-update loop to train the controller. At each step, the controller first samples a batch of models using its current parameters $\theta$, (e.g., by predicting a sequence of tokens based on the softmax log its from its RNN). For each sampled model m, it is trained on the target task to get its accuracy ACC(m), and run on real phones to get its inference latency LAT(m). Then, the reward value R(m) is calculated using equation (2). At the end of each step, the parameters $\theta$ of the controller are updated by maximizing the expected reward defined by equation (4) (e.g., using Proximal Policy Optimization (Schulman et al. 2017)). The sample-eval-update loop can be repeated until it reaches the maximum number of steps or the parameters $\theta$ converge.

Example Factorized Hierarchical Search Space

A well-defined search space is extremely important for neural architecture search. Thus, example aspects of the present disclosure are directed to a novel factorized hierarchical search space that partitions network layers into groups and searches for the operations and connections per group. In contrast to previous architecture search approaches which only search for a few complex cells and then repeatedly stack the same cells, the proposed search space simplifies the per-cell search space but allows cells to be different.

One principle recognized herein is that in order to obtain the best operations, a search should be performed based on the input and output shapes to obtain the best accurate-latency trade-offs. For example, earlier stages of CNN models usually process larger amounts of data and thus have much higher impact on inference latency than later stages. Formally, consider a widely-used depthwise separable convolution (Howard et al. 2018) kernel denoted as the four-tuple (K, K, M, N) that transforms an input of size (H, W, M) (batch size dimension is omitted for simplicity) to an output of size (H, W, N), where (H, W) is the input resolution and M, N are the input/output filter sizes. The total number of multiply-adds computation can be described as:

$$H*W*M*(K*K+N) \qquad (5)$$

where the first part, $H*W*M*K*K$, is for the depthwise convolution and the second part, $H*W*M*N$, is for the following 1×1 convolution. If the total computational resources are limited, the kernel size K and filter size N should be carefully balanced. For instance, increasing the effective receptive field with larger kernel size K of a layer must be balanced with reducing either the filter size N at the same layer, or compute from other layers.

Figure 3:
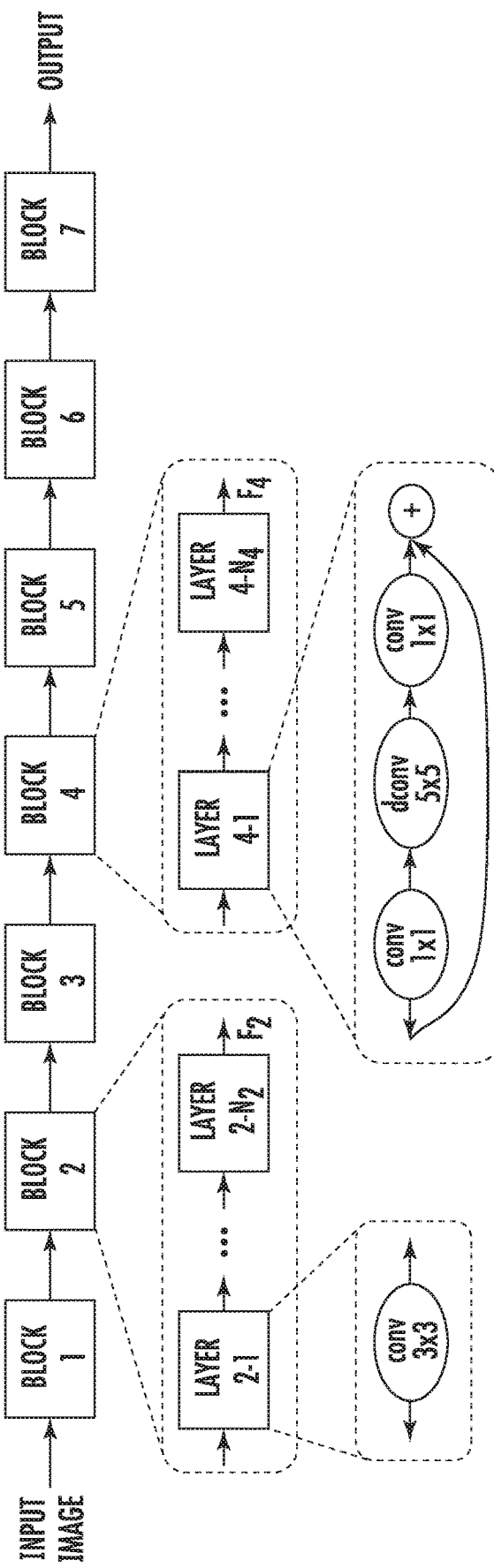
FIG. 3 depicts a graphical diagram of an example hierarchical network structure and search space according to example embodiments of the present disclosure.

FIG. 3 shows one example implementation of an example baseline structure of the search space proposed herein. The illustrated example partitions a CNN model into a sequence of pre-defined blocks, which may gradually reduce the input resolution and increase the filter size as is common in many CNN models. Each block can include a list of identical layers, whose operations and connections can be determined by a per-block sub search space. Specifically, a sub search space for a block i can include some or all of the following choices:

Convolutional operation to be performed ConvOp: regular cony (cony), depthwise cony (dconv), mobile inverted bottleneck cony with various expansion ratios (Sandler et al. 2018), group convolution, 1×7/7×1 convolution, and/or other operations.

Convolutional kernel size KernelSize: 3×3, 5×5, and/or other filter sizes.

Skip operations SkipOp: max or average pooling, identity residual skip, no skip path, and/or other skip operations.

Output filter size $F_i$.

Number of layers per block $N_i$.

Whether to perform a squeeze and excite operation in the layer and, if so, the squeeze and excite ratio value (e.g., 0, 0.25, 0.5, 0.75, 1.0, etc.). See Hu, Shen, and Sun 2018 for squeeze and excite concept.

In some implementations, ConvOp, KernelSize, SkipOp, $F_i$ uniquely determines the architecture of a layer, while $N_i$ determines how many times the layer would be repeated for the block. For example, in the illustrated example of FIG. 3, each layer of block 4 in FIG. 4 has an inverted bottleneck 5×5 convolution and an identity residual skip path, and the same layer is repeated $N_4$ times. The final search space is a concatenation of all sub search spaces for each block.

Additional information regarding depthwise separable convolutions and inverted bottleneck convolutions can be found in Sandler, M.; Howard, A.; Zhu, M.; Zhmoginov, A.; and Chen, L. C. 2018. Mobilenetv2: Inverted residuals and linear bottlenecks. CVPR. Additional information regarding depthwise separable convolutions and inverted bottleneck convolutions can be found in U.S. patent application Ser. No. 15/898,566 titled "Highly Efficient Convolutional Neural Networks" and filed on Feb. 17, 2018. U.S. patent application Ser. No. 15/898,566 is hereby incorporated by reference in its entirety.

Thus, FIG. 3 shows one graphical example of the factorized hierarchical search space. As illustrated in FIG. 3, network layers can be grouped into a number of predefined skeletons, called blocks, based on their input resolutions and filter sizes. Each block contains a variable number of repeated identical layers where, in some implementations, only the first layer has stride 2 if input/output resolutions are different but all other layers have stride 1. For each block, a search can be performed for the operations and connections for a single layer and the number of layers N, then the same layer is repeated N times (e.g., Layer 4-1 to 4-$N_4$ are the same). Layers from different blocks (e.g., Layer 2-1 and 4-1) can be different.

In some implementations, other and different characteristics, parameters, or hyperparameters of the layers in each block can also be included in the sub-search space associated with each block. As one example, stride can be a searchable parameter. As another example, input resolution or output resolution can be a searchable parameter, while the other can match the value identified for the previous or subsequent block. Conversely, any of the searchable parameters described above (e.g., filter size per block) can be optionally manually fixed rather than searched.

The factorized hierarchical search space has a distinct advantage of balancing the diversity of layers and the size of total search space. Suppose the network is partitioned into B blocks, and each block has a sub search space of size S with average N layers per block, then the total search space size would be $S^B$, versing the flat per-layer search space with size $S^{B*N}$. With typical N=3, the search space is orders of magnitude smaller than the flat per-layer search space. This reduced search space size provides a number of technical benefits. For example, reducing the size of the search space enables the systems and methods of the present disclosure to generate new neural architectures much faster and using much fewer computing resources (e.g., less processing power, less memory usage, less power consumption, etc.).

Example Experimental Setup

Directly searching for CNN models on large tasks like ImageNet or COCO is prohibitively expensive, as each model takes days to converge. Thus, the example architecture search experiments were conducted on a smaller proxy task, and then the top-performing models discovered during architecture search were transferred to the target full tasks. However, finding a good proxy task for both accuracy and latency is non-trivial: one has to consider task type, dataset type, input image size and type. Initial experiments on CIFAR-10 and the Stanford Dogs Dataset (Khosla et al. 2018) showed that these datasets are not good proxy tasks for ImageNet when model latency is taken into account.

In example experiments, the architecture search is directly performed on the ImageNet training set but with fewer training steps. As it is common in the architecture search literature to have a separate validation set to measure accuracy, 50K images were randomly selected and reserved from the training set as the fixed validation set. During example architecture searches, each sampled model is trained on 5 epochs of the proxy training set using an aggressive learning schedule, and the model is evaluated on the 50K validation set. Meanwhile, the real-world latency of each sampled model is measured by converting the model into TFLite format and running it on the single-thread big CPU core of Pixel 1 phones. In total, the controller samples about 8K models during architecture search, but only a few top-performing models (<15) are transferred to the full ImageNet or COCO. Note that the example experiments never evaluate on the original ImageNet validation dataset during architecture search.

For full ImageNet training, the example experiments use the RMSProp optimizer with decay 0.9 and momentum 0.9. Batch norm is added after every convolution layer with momentum 0.9997, and weight decay is set to 0.00001. The learning rate is linearly increased from 0 to 0.256 in the first 5-epoch warmup training stage, and then the learning rate is decayed by 0.97 every 2.4 epochs. These hyperparameters are determined with a small grid search of 8 combinations of weight decay {0.00001, 0.00002}, learning rate {0.256, 0.128}, and batchnorm momentum {0.9997, 0.999}. The example experiments use standard Inception preprocessing and resize input images to 224×224 unless explicitly specified otherwise.

For full COCO training, the learned model architecture is plugged into the open-source TensorFlow Object Detection framework, as a new feature extractor. Object detection training settings are set to be the same as (Sandler et al. 2018), including the input size 320×320.

Example Experimental Results

ImageNet Classification Performance

TABLE 1

Performance Results on ImageNet Classification (Russakovsky et al. 2015). The MnasNet models were compared with both manually-designed mobile models and other automated approaches-MnasNet is the baseline model generated according to example implementations of the present disclosure; MnasNet-65 and MnasNet-92 are two models (for comparison) with different latency from the same architecture search experiment; +SE denotes with additional squeeze-and-excitation optimization (Hu, Shen, and Sun 2018); #Parameters: number of trainable parameters; #Mult-Adds: number of multiply-add operations per image; Top-1/5 Acc.: the top-1 or top-5 accuracy on ImageNet validation set; CPU Latency: the inference latency with batch size 1 on Pixel 1 Phone.

| Model | Type | #Parameters | #Mult-Adds | Top-1 Acc. (%) | Top-5 Acc. (%) | CPU Latency |
|---|---|---|---|---|---|---|
| MobileNetV1 (Howard et al. 2017) | manual | 4.2M | 575M | 70.6 | 89.5 | 113 ms |

TABLE 1-continued

Performance Results on ImageNet Classification (Russakovsky et al. 2015). The MnasNet models were compared with both manually-designed mobile models and other automated approaches-MnasNet is the baseline model generated according to example implementations of the present disclosure; MnasNet-65 and MnasNet-92 are two models (for comparison) with different latency from the same architecture search experiment; +SE denotes with additional squeeze-and-excitation optimization (Hu, Shen, and Sun 2018); #Parameters: number of trainable parameters; #Mult-Adds: number of multiply-add operations per image; Top-1/5 Acc.: the top-1 or top-5 accuracy on ImageNet validation set; CPU Latency: the inference latency with batch size 1 on Pixel 1 Phone.

| Model | Type | #Parameters | #Mult-Adds | Top-1 Acc. (%) | Top-5 Acc. (%) | CPU Latency |
|---|---|---|---|---|---|---|
| SqueezeNext (Gholami et al. 2018) | manual | 3.2M | 708M | 67.5 | 88.2 | — |
| ShuffleNet (1.5) (Zhang et al. 2018) | manual | 3.4M | 292M | 71.5 | — | — |
| ShuffleNet (x2) | manual | 5.4M | 524M | 73.7 | — | — |
| CondenseNet (G = C = 4) (Huang et al. 2018) | manual | 2.9M | 274M | 71.0 | 90.0 | — |
| CondenseNet (G = C = 8) | manual | 4.8M | 529M | 73.8 | 91.7 | — |
| MobileNetV2 (Sandler et al. 2018) | manual | 3.4M | 300M | 72.0 | 91.0 | 75 ms |
| MobileNetV2 (1.4) | manual | 6.9M | 585M | 74.7 | 92.5 | 143 ms |
| NASNet-A (Zoph et al. 2018) | auto | 5.3M | 564M | 74.0 | 91.3 | 183 ms |
| AmoebaNet-A (Real et al. 2018) | auto | 5.1M | 555M | 74.5 | 92.0 | 190 ms |
| PNASNet (Liu et al. 2018a) | auto | 5.1M | 588M | 74.2 | 91.9 | — |
| DARTS (Liu, Simonyan, and Yang 2018) | auto | 4.9M | 595M | 73.1 | 91.0 | — |
| MnasNet | auto | 4.2M | 317M | 74.0 | 91.78 | 76 ms |
| MnasNet-65 | auto | 3.6M | 270M | 73.02 | 91.14 | 65 ms |
| MnasNet-92 | auto | 4.4M | 388M | 74.79 | 92.05 | 92 ms |
| MnasNet (+SE) | auto | 4.7M | 319M | 75.42 | 92.51 | 90 ms |
| MnasNet-65 (+SE) | auto | 4.1M | 272M | 74.62 | 91.93 | 75 ms |
| MnasNet-92 (+SE) | auto | 5.1M | 391M | 76.13 | 92.85 | 107 ms |

Table 1 shows the performance of the models on ImageNet (Russakovsky et al. 2015). The target latency is set as T=80 ms, similar to MobileNetV2 (Sandler et al. 2018), and Equation (2) is used with $\alpha=\beta=-0.07$ as the reward function during architecture search. Afterwards, three top-performing MnasNet models with different latency-accuracy trade-offs from the same search experiment were selected and compared with existing mobile CNN models.

As shown in the table, the presented MnasNet model achieves 74% top-1 accuracy with 317 million multiply-adds and 76 ms latency on a Pixel phone, achieving a new state-of-the-art accuracy for this typical mobile latency constraint. Compared with the recent MobileNetV2 (Sandler et al. 2018), MnasNet improves the top-1 accuracy by 2% while maintaining the same latency; on the more accurate end, MnasNet-92 achieves a top-1 accuracy of 74.79% and runs 1.55× faster than MobileNetV2 on the same Pixel phone. Compared with recent automatically searched CNN models, the presented MnasNet runs 2.4× faster than the mobile-size NASNet-A (Zoph et al. 2018) with the same top-1 accuracy.

For a fair comparison, the recent squeeze-and-excitation optimization (Hu, Shen, and Sun 2018) is not included in the presented baseline MnasNet models since all other models in Table 1 do not have this optimization. However, the presented approach can take advantage of these recently introduced operations and optimizations. For instance, by incorporating the squeeze-and-excitation denoted as (+SE) in Table 1, the presented MnasNet-92(+SE) model achieves ResNet-50 (He et al. 2016) level top-1 accuracy at 76.13%, with 19× fewer parameters and 10× fewer multiply-add operations.

Notably, the example experiments only tune the hyper-parameters for MnasNet on 8 combinations of learning rate, weight decay, batch norm momentum, and then simply uses the same training settings for MnasNet-65 and MnasNet-92. Therefore, the present disclosure confirms that the performance gains are from the novel search space and search method, rather than the training settings.

Architecture Search Method

The presented example multi-objective search method allows for the ability to deal with both hard and soft latency constraints by setting $\alpha$ and $\beta$ to different values in reward equation (2).

Figure 5A:
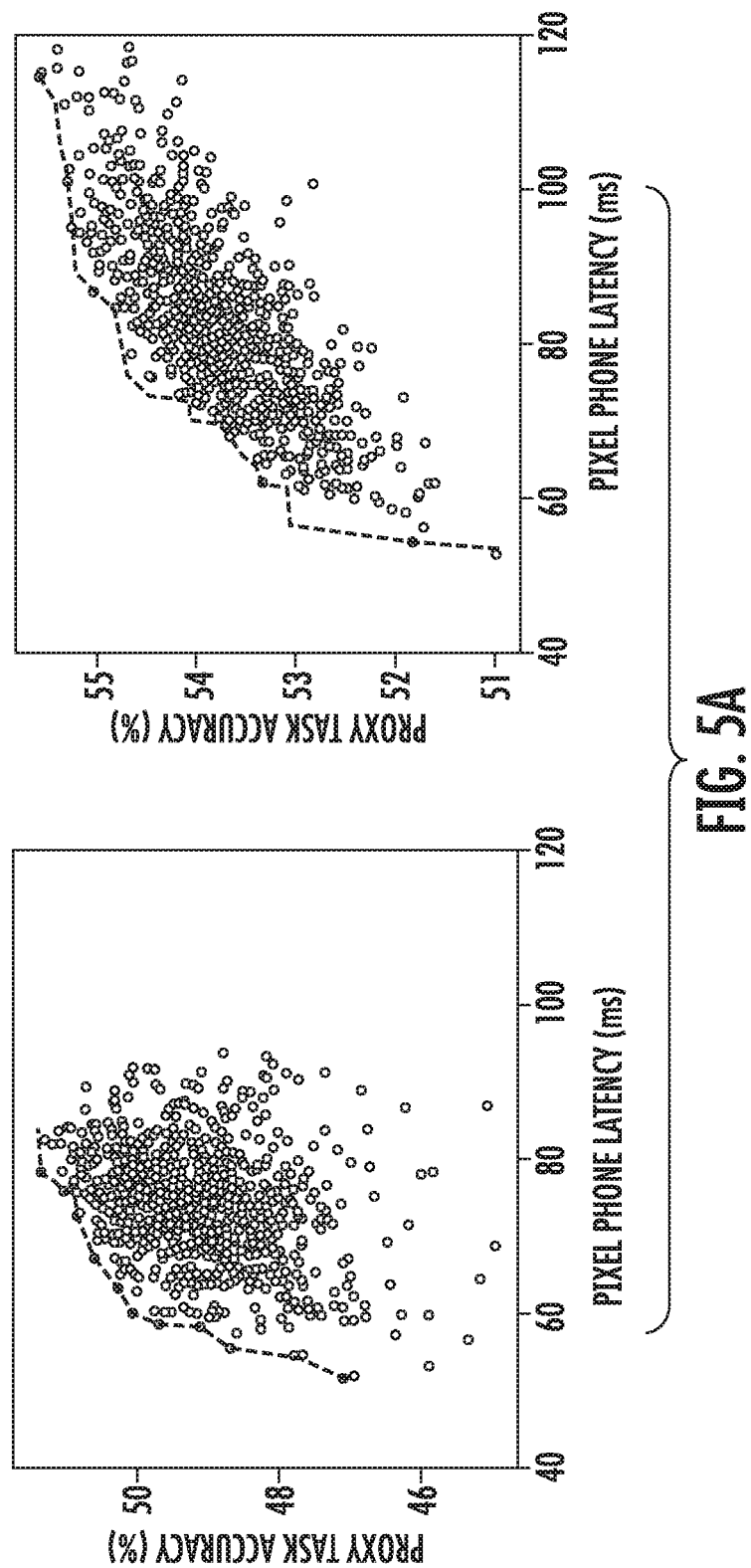
FIGS. 5A-B depict graphs of example multi-objective search results according to example embodiments of the present disclosure.
Figure 5B:
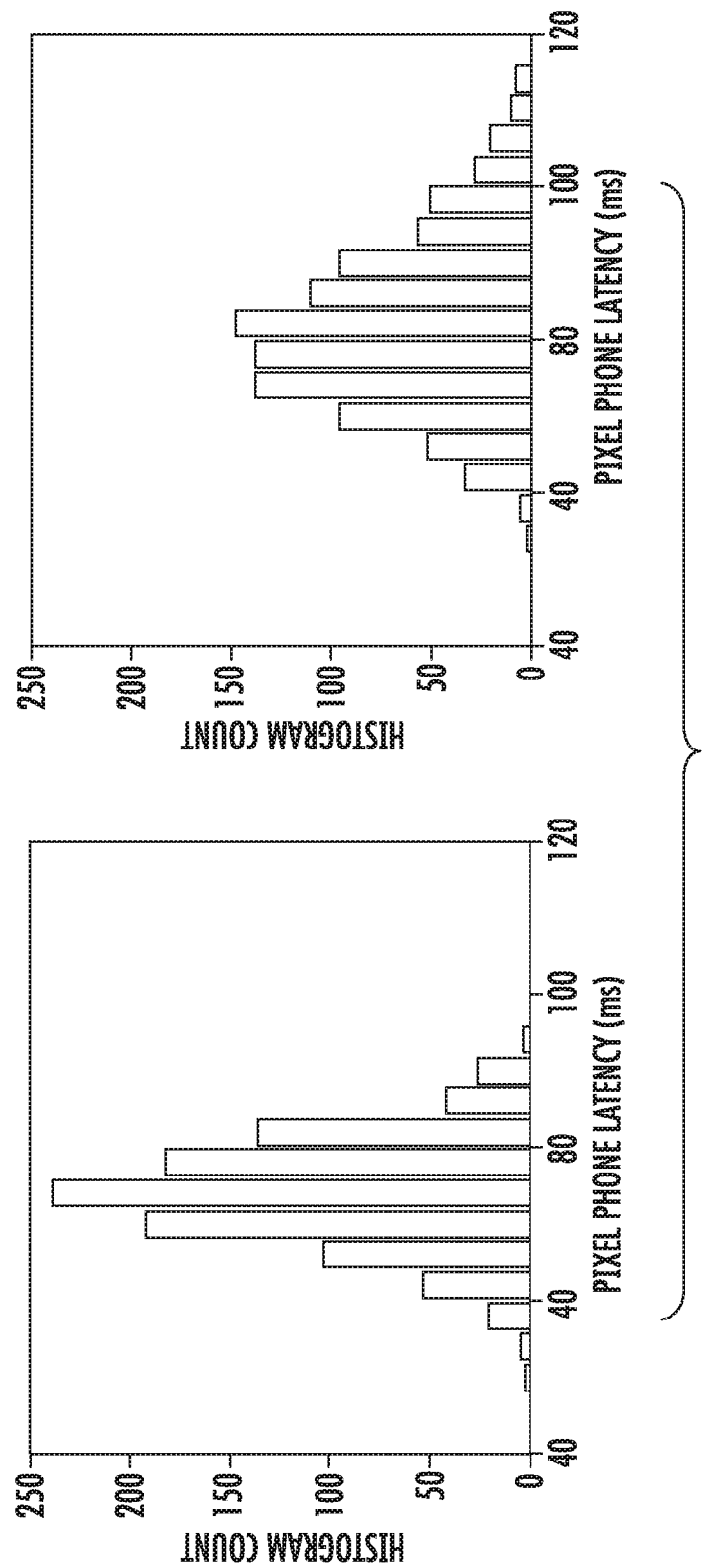

FIGS. 5A and 5B show the multi-objective search results for typical $\alpha$ and $\beta$. FIG. 5A shows the Pareto curve (dashed line) for the 1000 sampled models (dots). FIG. 5B shows the histogram of model latency. When $\alpha=0$, $\beta=-1$, the latency is treated as a hard constraint (T=80 ms), so the controller tends to search for models within a very small latency range around the target latency value. On the other hand, by setting $\alpha=\beta=-0.07$, the controller treats the target latency as a soft constraint and tries to search for models across a wider latency range. It samples more models around the target latency value at 80 ms, but also explores models with latency smaller than 60 ms or greater than 110 ms. This allows for the ability to pick multiple models from the Pareto curve in a single architecture search as shown in Table 1.

Sensitivity to Model Scaling

Given the myriad application requirements and device heterogeneity present in the real world, developers often scale a model up or down to trade accuracy for latency or model size. One common scaling technique is to modify the filter size of the network using a depth multiplier (Howard et al. 2017), which modifies the number of filters in each layer with the given ratio. For example, a depth multiplier of 0.5 halves the number of channels in each layer compared to the default, thus significantly reducing the computational resources, latency, and model size. Another common model scaling technique is to reduce the input image size without changing the number of parameters of the network.

Figure 4A:
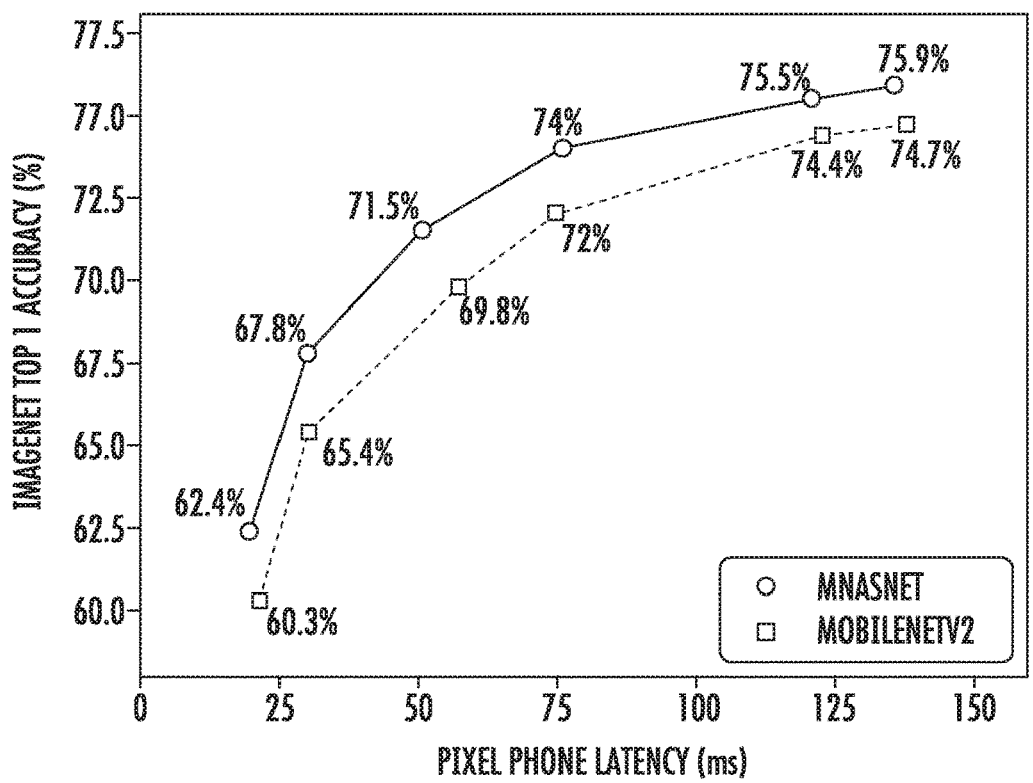
FIGS. 4A and 4B depict graphs that show example performance comparisons with different model scaling techniques according to example embodiments of the present disclosure.
Figure 4B:
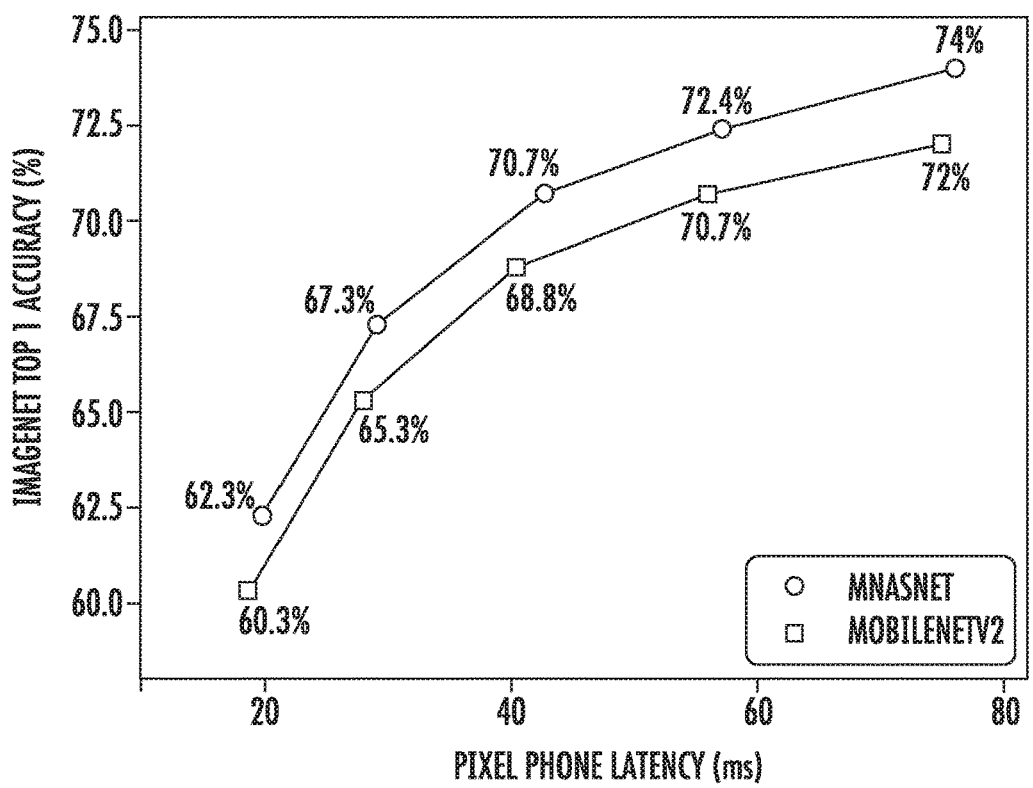

FIGS. 4A and 4B compare the performance of MnasNet and MobileNetV2 with different depth multipliers and input image sizes. In particular, in FIG. 4A, Depth multiplier=0.35, 0.5, 0.75, 1.0, 1.3, 1.4, corresponding to points from left to right. In FIG. 4B, Input size=96, 128, 160, 192, 224, corresponding to points from left to right.

As the depth multiplier changes from 0.35 to 1.4, the inference latency also varies from 20 ms to 130 ms, but as shown in FIG. 4A, the MnasNet model consistently achieves better top-1 accuracy than MobileNetV2 for each depth multiplier. Similarly, the presented model is also robust to input size changes and consistently outperforms MobileNetV2 across all input image sizes from 96 to 224, as shown in FIG. 4B.

Figure 6:
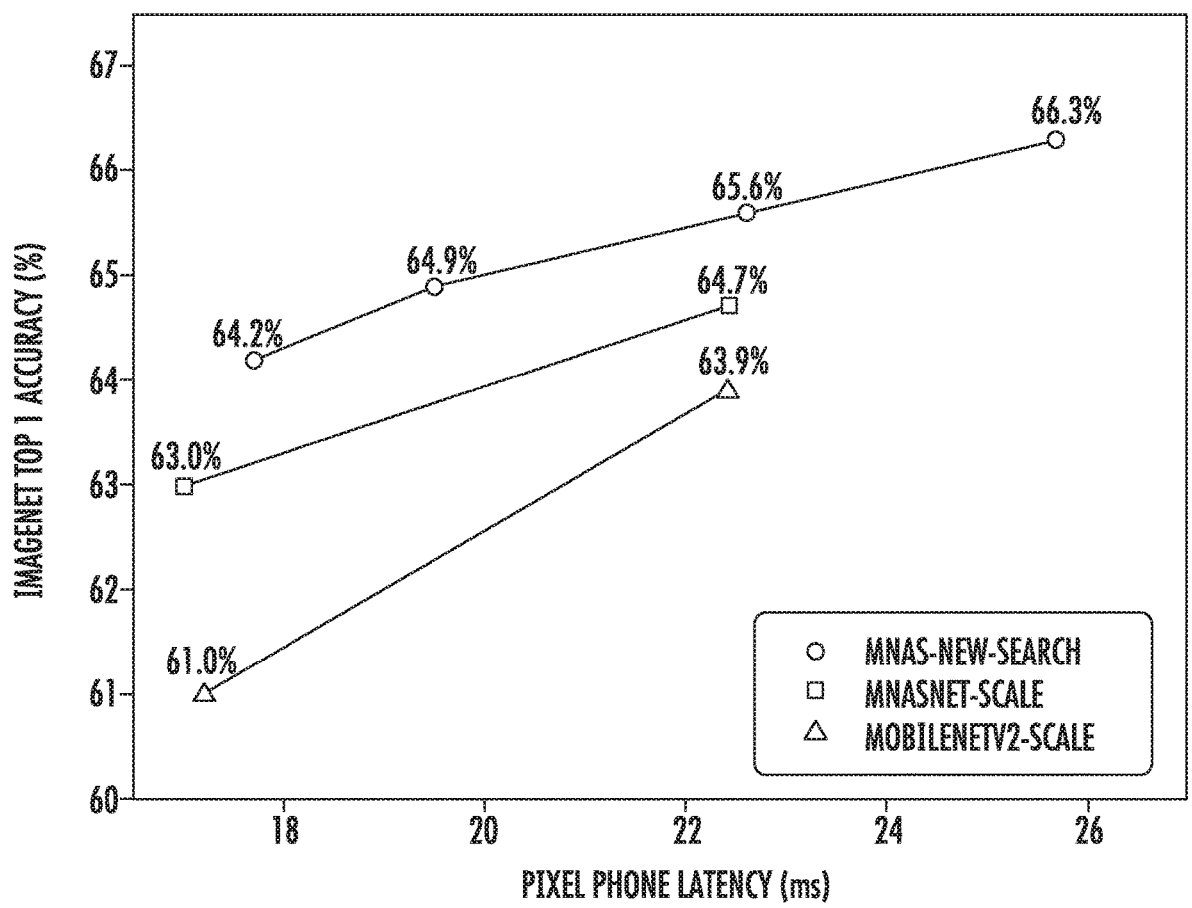
FIG. 6 depicts a graph of example model scaling versus model search results according to example embodiments of the present disclosure.

In addition to model scaling, this approach also enables us to search a new architecture for any new resource constraints. For example, some video applications may require model latency as low as 25 ms. To meet such constraints, the present disclosure can either scale a baseline model with smaller input size and depth multiplier or can search for models more targeted to this new latency constraint. FIG. 6 shows the performance comparison of these two approaches. The best scaling parameters (depth multiplier=0.5, input size=192) were chosen from all possible combinations shown in (Sandler et al. 2018), and also a new search was started with the same scaled input size. For comparison, FIG. 6 also shows the scaling parameter (0.5, 160) that has the best accuracy among all possible parameters under the smaller 17 ms latency constraint. As shown in the figure, although MnasNet already outperforms MobileNetV2 under the same scaling parameters, further improvement can be achieved to the accuracy with a new architecture search targeting a 23 ms latency constraint.

COCO Object Detection Performance the models with other SSD or YOLO detectors since the focus is on mobile devices with limited on-device computational resources.

Table 2 shows the performance of our MnasNet models on COCO. Results for YOLO and SSD are from (Redmon and Farhadi 2017), while results for MobileNet are from (Sandler et al. 2018). The MnasNet models are trained on COCO trainval 35 k and evaluated on test-dev2017 by submitting the results to COCO server. As shown in the table, the presented approach improves both the inference latency and the mAP quality (COCO challenge metrics) over MobileNet V1 and V2. For comparison, the slightly larger MnasNet-92 achieves a comparable mAP quality (22.9 vs 23.2) as SSD300 (Liu et al. 2016) with 7× fewer parameters and 35× fewer multiply-add computations.

Example Neural Architectures and Discussion

Figure 7A:
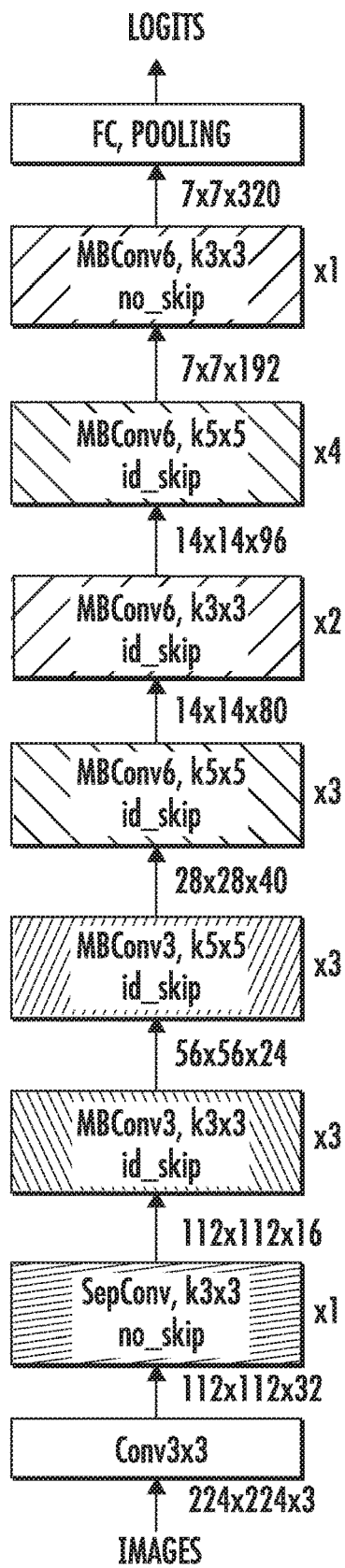
FIGS. 7A-F depict graphical diagrams of one example new network structure generated using example embodiments of the present disclosure.

FIGS. 7A-F illustrate an example MnasNet Architecture. FIG. 7A is the MnasNet model shown in Table 1; FIGS. 7B-F are the corresponding layers structure for MnasNet, with hatching of the layers showing how they correspond to the layers of FIG. 7A. MBConv denotes mobile inverted bottleneck cony, SepConv denotes depthwise separable cony, k3×3/k5×5 denotes kernel size 3×3 or 5×5, no_skip/ id_skip denotes no skip or identity residual skip, H×W×F denotes the tensor shape of (height, width, depth), and x 1/2/3/4 denotes the number of repeated layers within the block. All layers have stride 1, except the first layer of each block has stride 2 if input/output resolutions are different. Notably, (d) and (f) are also the basic building block of MobileNetV2 and MobileNetV1 respectively.

More particularly, FIG. 7A illustrates the neural network architecture for the baseline MnasNet shown in Table 1. It consists of a sequence of linearly connected blocks, and each block is composed of different types of layers shown in FIGS. 7B-F. As expected, it utilizes depthwise convolution extensively across all layers to maximize model computational efficiency. Furthermore, some interesting findings are also observed:

In trying to better understand how MnasNet models are different from prior mobile CNN models, it can be noticed

TABLE 2

Performance Results on COCO Object Detection-#Parameters: number of trainable parameters; #Mult-Adds: number of multiply-additions per image; mAP: standard mean average precision on test-dev2017; $mAP_S$, $mAP_M$, $mAP_L$: mean average precision on small, medium, large objects; CPU Latency: the inference latency on Pixel 1 Phone.

| Network | #Parameters | #Mult-Adds | mAP | $mAP_S$ | $mAP_M$ | $mAP_L$ | CPU Latency |
|---|---|---|---|---|---|---|---|
| YOLOv2 (Redmon and Farhadi 2017) | 50.7M | 17.5 B | 21.6 | 5.0 | 22.4 | 35.5 | — |
| SSD300 (Liu etal. 2016) | 36.1M | 35.2 B | 23.2 | 5.3 | 23.2 | 39.6 | — |
| SSD512 (Liu etal. 2016) | 36.1M | 99.5 B | 26.8 | 9.0 | 28.9 | 41.9 | — |
| MobileNetV1 + SSDLite (Howard et al. 2017) | 5.1M | 1.3 B | 22.2 | — | — | — | 270 ms |
| MobileNetV2 + SSDLite (Sandler et al. 2018) | 4.3M | 0.8 B | 22.1 | — | — | — | 200 ms |
| MnasNet + SSDLite | 4.3M | 0.7 B | 22.3 | 3.1 | 19.5 | 42.9 | 190 ms |
| MnasNet-92 + SSDLite | 5.3M | 1.0 B | 22.9 | 3.6 | 20.5 | 43.2 | 227 ms |

For COCO object detection (Lin et al. 2014), the same MnasNet models as in Table 1 are picked, and used as the feature extractor for SSDLite, a modified resource-efficient version of SSD (Sandler et al. 2018). As recommended by (Sandler et al. 2018), the present disclosure only compares that these models contain more 5×5 depthwise convolutions than prior work (Zhang et al. 2018), where only 3×3 kernels are typically used. In fact, a 5×5 kernel could indeed be more resource-efficient than two 3×3 kernels for depthwise separable convolution. Formally, given an input shape (H,W,M)

and output shape (H, W, N), let $C_{5\times 5}$ and $C_{3\times 3}$ denote the computational cost measured by number of multiply-adds for depthwise separable convolution with kernel 5×5 and 3×3 respectively:

$$C_{5\times 5}=H*W*M*(25+N)$$

$$C_{3\times 3}=H*W*M*(9+N)$$

$$C_{5\times 5}<2*C_{3\times 3} \text{ if } N>7 \qquad (6)$$

For the same effective receptive field, a 5×5 kernel has fewer multiply-adds than two 3×3 kernels when the input depth N>7. Assuming the kernels are both reasonably optimized, this might explain why the presented MnasNet utilizes many 5×5 depthwise convolutions when both accuracy and latency are part of the optimization metric.

Most common mobile architectures typically repeat an architectural motif several times, only changing the filter sizes and spatial dimensions throughout the model. The factorized, hierarchical search space allows the model to have different types of layers throughout the network, as shown in FIG. 7B-F, whereas MobileNet V1 and V2 only uses building block F and D respectively. As an ablation study, Table 3 compares MnasNet with its variants that repeat a single type of layer throughout the network. As shown in the table, MnasNet has much better accuracy-latency trade-offs over those variants, suggesting the importance of layer diversity in resource-constrained CNN models.

TABLE 3

Performance Comparison of MnasNet and Its Variants - MnasNet denotes the same model shown in FIG. 7A; FIG. 7B-7E denote its variants that repeat a single type of layer throughout the network. All models have the same number of layers and same filter size at each layer.

Figure 7B:
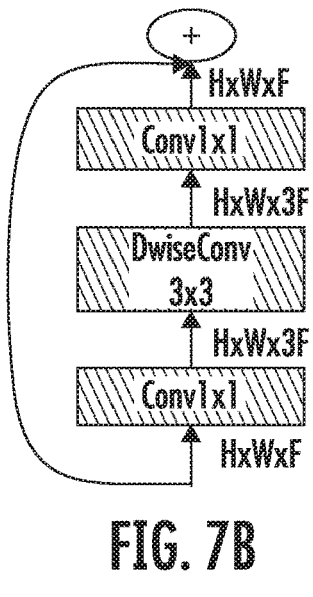
Figure 7C:
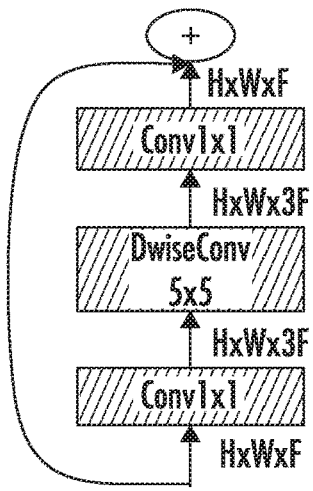
Figure 7D:
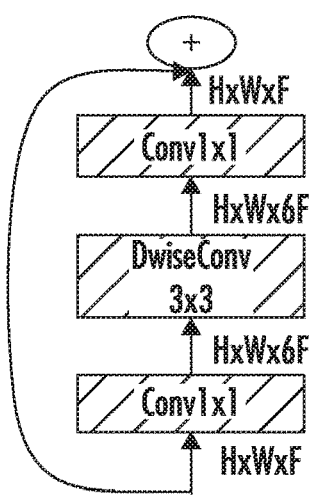
Figure 7E:
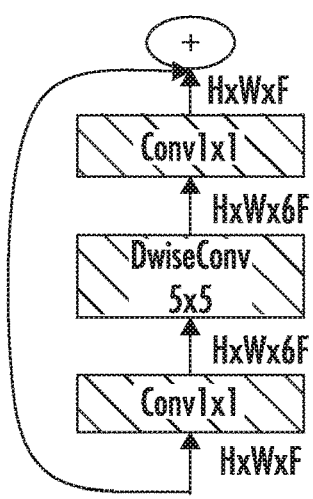
Figure 7F:
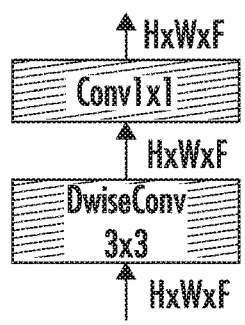

|  | Top-1 Acc. | CUP Latency |
| --- | --- | --- |
| MnasNet | 74.0 | 76 ms |
| FIG. 7B only | 71.3 | 67 ms |
| FIG. 7C only | 72.3 | 84 ms |
| FIG. 7D only | 74.1 | 123 ms |
| FIG. 7E only | 74.8 | 157 ms |

Example Devices and Systems

Figure 8A:
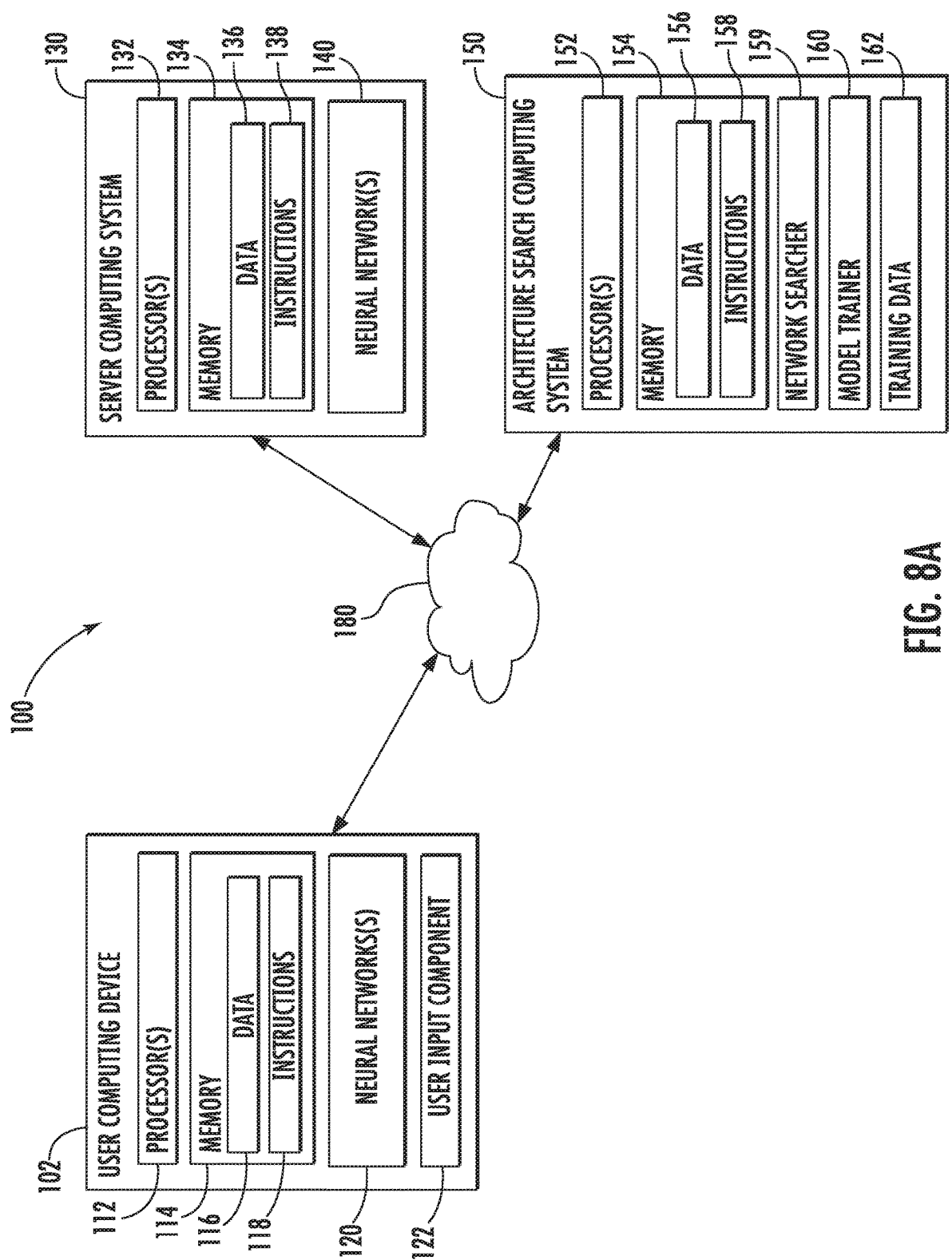
FIG. 8A depicts a block diagram of an example computing system according to example embodiments of the present disclosure.

FIG. 8A depicts a block diagram of an example computing system 100 according to example embodiments of the present disclosure. The system 100 includes a user computing device 102, a server computing system 130, and an architecture search computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more neural networks 120. For example, the neural networks 120 can be or can otherwise include various machine-learned models such feed-forward neural networks, recurrent neural networks (e.g., long short-term memory recurrent neural networks), convolutional neural networks or other forms of neural networks.

In some implementations, the one or more neural networks 120 can be received from the server computing system 130 over network 180, stored in the user computing device memory 114, and then used or otherwise implemented by the one or more processors 112. In some implementations, the user computing device 102 can implement multiple parallel instances of a single neural network 120

Additionally or alternatively, one or more neural networks 140 can be included in or otherwise stored and implemented by the server computing system 130 that communicates with the user computing device 102 according to a client-server relationship. For example, the neural networks 140 can be implemented by the server computing system 140 as a portion of a web service. Thus, one or more networks 120 can be stored and implemented at the user computing device 102 and/or one or more networks 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned neural networks 140. For example, the neural networks 140 can be or can otherwise include feed forward neural networks, deep neural networks, recurrent neural networks, and convolutional neural networks.

The user computing device 102 and/or the server computing system 130 can train and/or evaluate the networks 120 and/or 140 via interaction with the architecture search computing system 150 that is communicatively coupled over the network 180. The architecture search computing system 150 can be separate from the server computing system 130 or can be a portion of the server computing system 130.

The architecture search computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the architecture search computing system 150 to perform operations. In some implementations, the architecture search computing system 150 includes or is otherwise implemented by one or more server computing devices.

The architecture search computing system 150 can include a model trainer 160 that trains and/or evaluates the machine-learned networks 120 and/or 140 stored at the user computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the neural networks 120 and/or 140 based on a set of training data 162. In some implementations, if the user has provided consent, the training examples can be provided by the user computing device 102. Thus, in such implementations, the network 120 provided to the user computing device 102 can be trained by the architecture search computing system 150 on user-specific data received from the user computing device 102. In some instances, this process can be referred to as personalizing the model.

The architecture search computing system 150 can also include a network searcher 159. The network searcher 159 can have the components and framework described herein, such as, for example, as illustrated in FIG. 1. Thus, for example, the network searcher 159 can include a controller (e.g., an RNN-based controller) and a reward generator. The network searcher 159 can cooperate with the model trainer 160 to train the controller and/or generated architectures. The architecture search computing system 150 can also optionally be communicatively coupled with various other devices (not specifically shown) that measure performance parameters of the generated networks (e.g., mobile phone replicas which replicate mobile phone performance of the networks).

Each of the model trainer 160 and the network searcher 159 can include computer logic utilized to provide desired functionality. Each of the model trainer 160 and the network searcher 159 can be implemented in hardware, firmware, and/or software controlling a general purpose processor. For example, in some implementations, each of the model trainer 160 and the network searcher 159 can include program files stored on a storage device, loaded into a memory and executed by one or more processors. In other implementations, each of the model trainer 160 and the network searcher 159 can include one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 8A illustrates one example computing system that can be used to implement the present disclosure. Other computing systems can be used as well. For example, in some implementations, the user computing device 102 can include the model trainer 160 and the training dataset 162. In such implementations, the networks 120 can be both trained and used locally at the user computing device 102. In some of such implementations, the user computing device 102 can implement the model trainer 160 to personalize the networks 120 based on user-specific data.

Further, although the present disclosure is described with particular reference to neural networks. The systems and methods described herein can be applied to other multi-layer machine-learned model architectures.

Figure 8B:
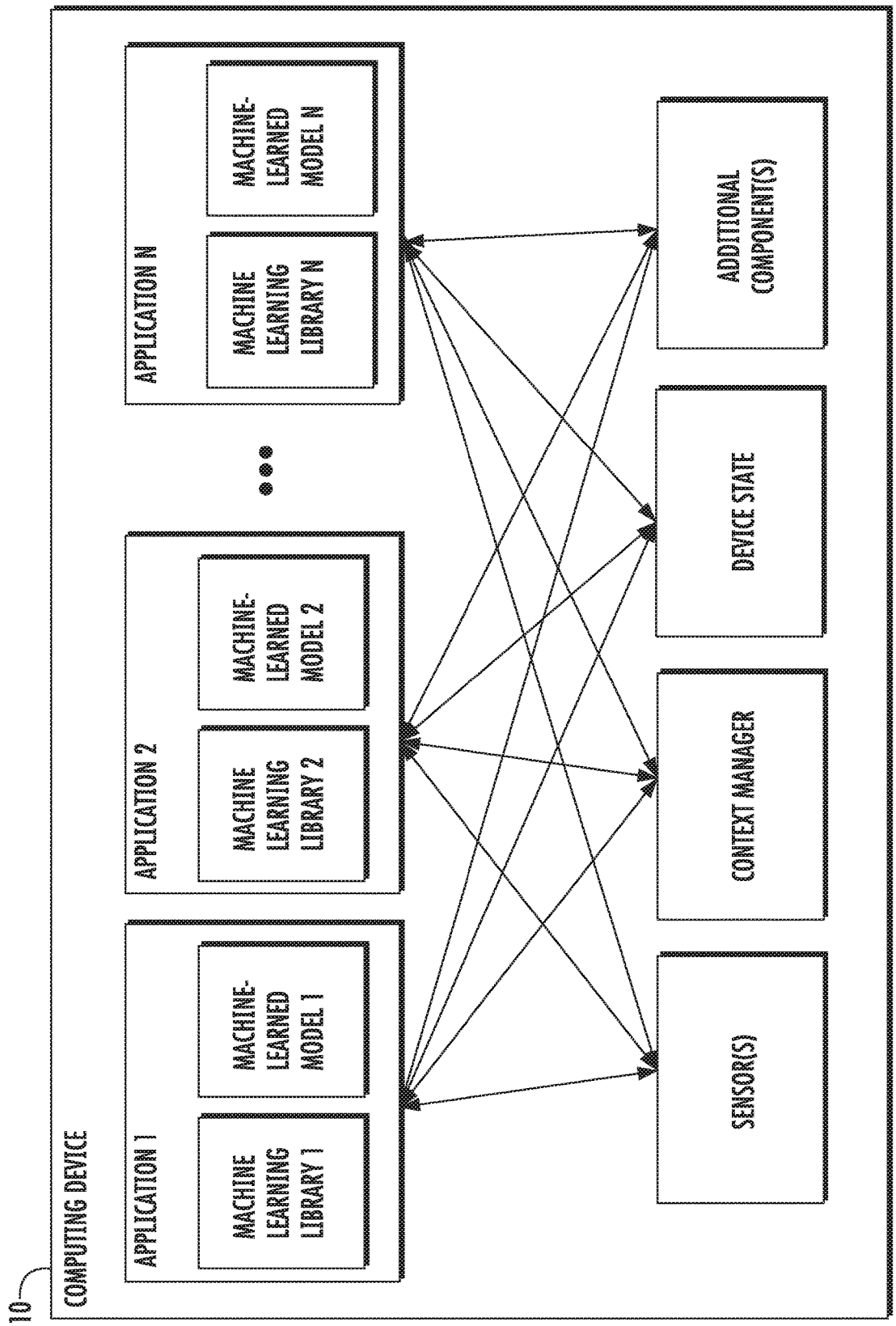
FIG. 8B depicts a block diagram of an example computing device according to example embodiments of the present disclosure.

FIG. 8B depicts a block diagram of an example computing device 10 according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 8B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 8C:
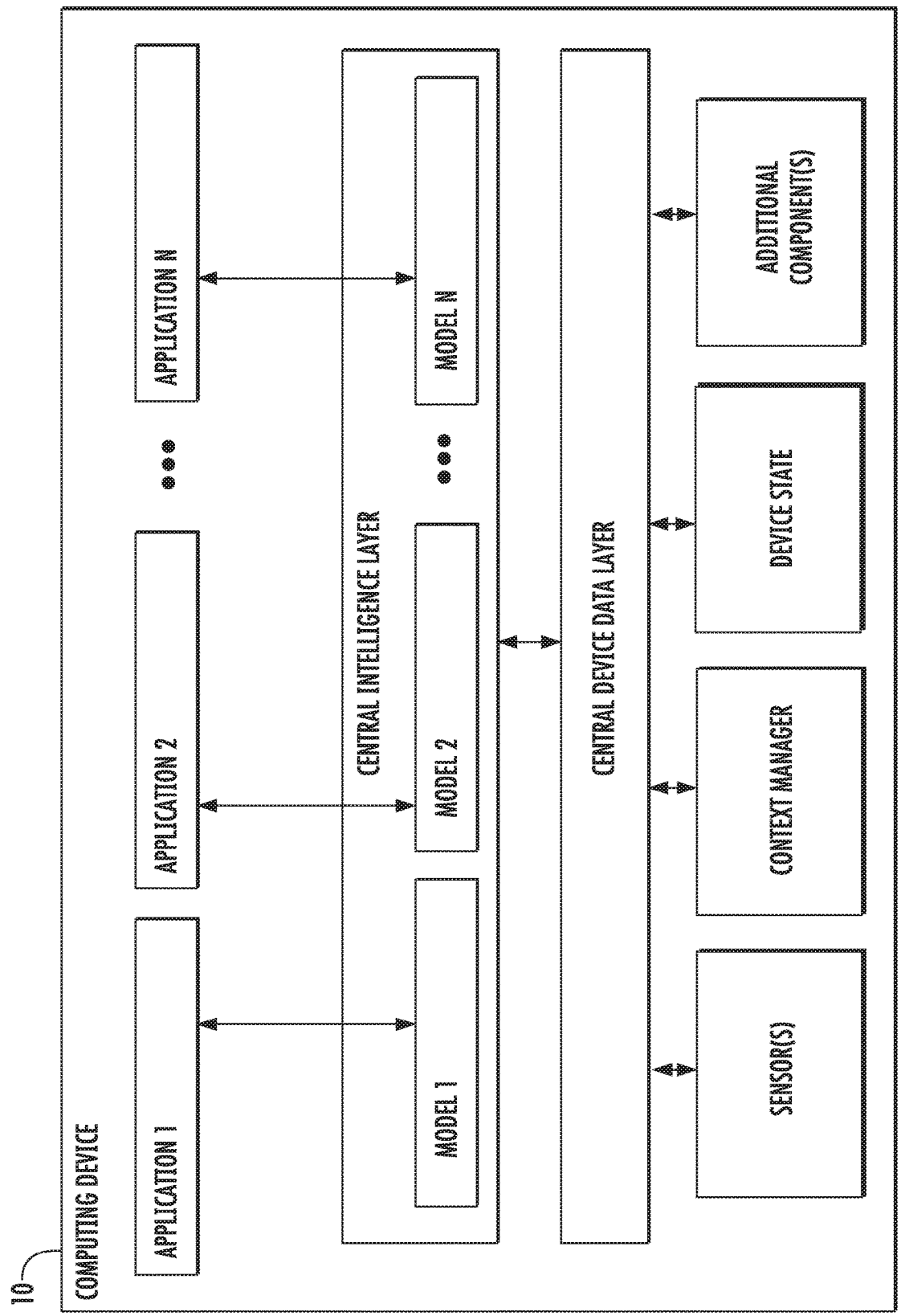
FIG. 8C depicts a block diagram of an example computing device according to example embodiments of the present disclosure.

FIG. 8C depicts a block diagram of an example computing device 50 according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 8C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 8C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Methods

Figure 9:
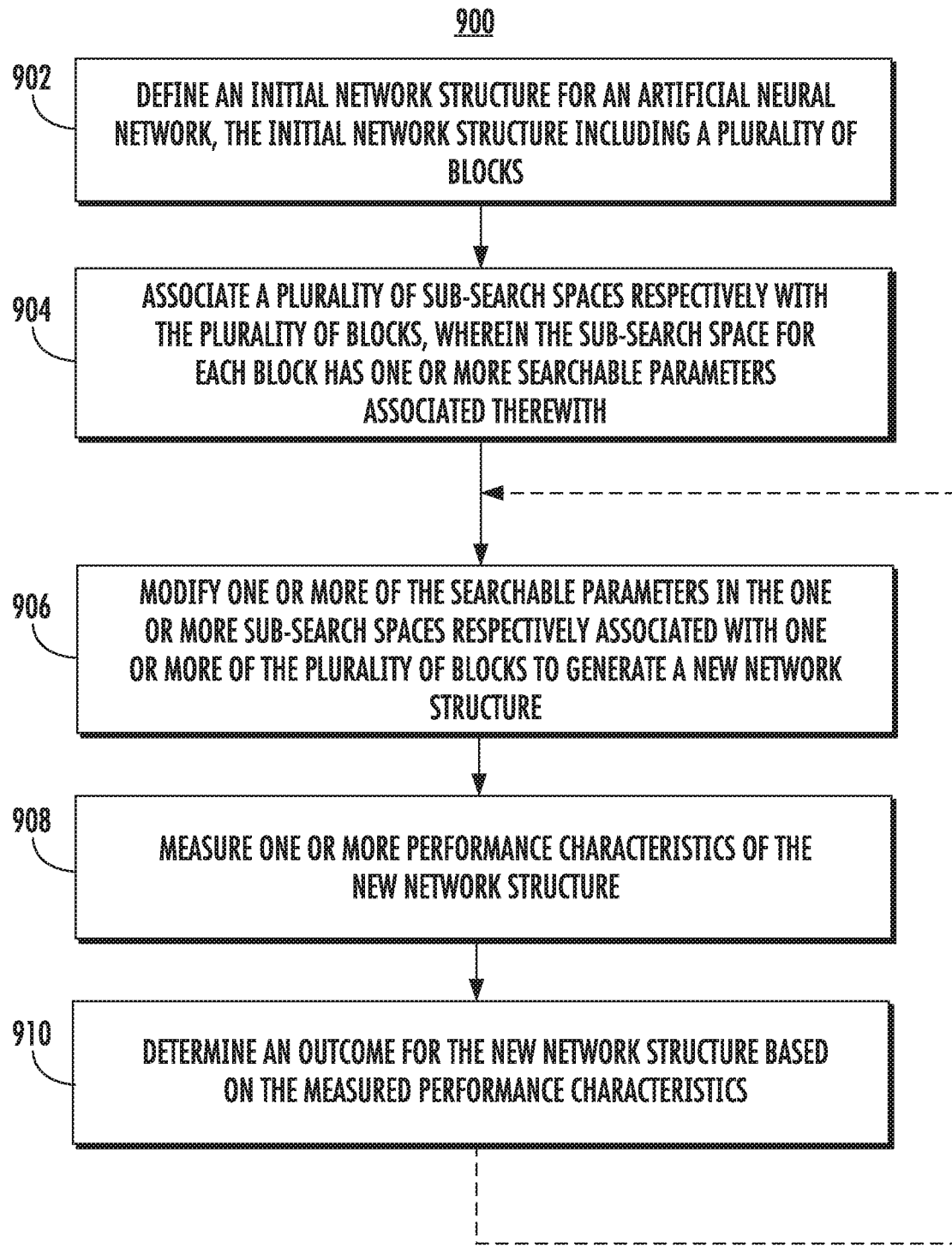
FIG. 9 depicts a flow chart diagram of an example method to perform a neural architecture search according to example embodiments of the present disclosure.

FIG. 9 depicts a flow chart diagram of an example method to perform according to example embodiments of the present disclosure. Although FIG. 9 depicts steps performed in a particular order for purposes of illustration and discussion, the methods of the present disclosure are not limited to the particularly illustrated order or arrangement. The various steps of the method 900 can be omitted, rearranged, combined, and/or adapted in various ways without deviating from the scope of the present disclosure.

At 902, a computing system can define an initial network structure for an artificial neural network. The initial network structure can include a plurality of blocks.

At 904, the computing system can associate a plurality of sub-search spaces respectively with the plurality of blocks. The sub-search space for each block can have one or more searchable parameters associated therewith. In some implementations, the plurality of sub-search spaces can be independent from each other such that modification of at least one of the searchable parameters in one of the sub-search spaces does not necessitate modification of the searchable parameters of any other of the sub-search spaces.

In some implementations, the one or more searchable parameters included in the sub-search space associated with at least one of the plurality of blocks can include a number of layers included in the block. For the at least one of the plurality of blocks, the number of layers can include a number of identical layers and the searchable parameters for such block can be uniformly applied to the number of identical layers included in such block.

In some implementations, the one or more searchable parameters included in the sub-search space associated with at least one of the plurality of blocks comprise an operation to be performed by each of one or more layers included in the block. As examples, a set of available operations for the searchable parameter of the operation to be performed include one or more of: a convolution; a depthwise convolution; an inverted bottleneck convolution; or a group convolution.

In some implementations, the one or more searchable parameters included in the sub-search space associated with at least one of the plurality of blocks can include one or more of: a kernel size; a skip operation to be performed; or an output filter size.

In some implementations, all of the plurality of sub-search spaces share a same set of searchable parameters while in other implementations at least two of the plurality of sub-search spaces have different sets of searchable parameters associated therewith.

At 906, the computing system can modify at least one of the searchable parameters in the sub-search space associated with at least one of the plurality of blocks to generate a new network structure for the artificial neural network. In some implementations, modifying at least one of the searchable parameters in the sub-search space associated with at least one of the plurality of blocks at 906 can include sampling a batch of models using the current parameters θ of a controller to generate new network structures. In some implementations, modifying at least one of the searchable parameters in the sub-search space associated with at least one of the plurality of blocks at 906 can include randomly modifying at least one of the searchable parameters in the sub-search space associated with at least one of the plurality of blocks.

At 908, the computing system can measure one or more performance characteristics of the new network structure. In some implementations, the one or more performance characteristics can include an accuracy of the new network structure, a real-world latency associated with implementation of the new network structure on a real-world mobile device, a power usage of the new network structure, a memory usage of the new network structure, and/or a peak compute usage of the new network structure.

At 910, the computing system can determine an outcome for the new network structure based on the measured performance characteristics. In some implementations, determining the outcome at 910 can include determining a reward to provide to a controller in a reinforcement learning scheme based at least in part on the one or more performance characteristics. In some implementations, determining the outcome at 910 can include modifying one or more parameters of the controller based on the determined reward. In some implementations, determining the outcome at 910 can include comparing the performance characteristics of the new network structure to those of a best-previously-observed structure to determine whether to keep or discard the new network structure.

After 910, the method 900 can optionally return to block 906 and again determine a new network structure. Thus, blocks 906-910 can be iteratively performed to identify and evaluate new network structures.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

One example aspect of the present disclosure is directed to a computer-implemented method, the method comprising: defining, by one more computing devices, an initial network structure for an artificial neural network, the initial network structure comprising a plurality of blocks; associating, by the one or more computing devices, a plurality of sub-search spaces respectively with the plurality of blocks, wherein the sub-search space for each block has one or more searchable parameters associated therewith, wherein the one or more searchable parameters included in the sub-search space associated with at least one of the plurality of blocks comprise a number of layers included in the block; and for each of one or more iterations: modifying, by one or more computing devices, at least one of the searchable parameters in the sub-search space associated with at least one of the plurality of blocks to generate a new network structure for the artificial neural network.

In some implementations, the plurality of sub-search spaces are independent from each other such that modification of at least one of the searchable parameters in one of the sub-search spaces does not necessitate modification of the searchable parameters of any other of the sub-search spaces.

In some implementations, for the at least one of the plurality of blocks, the number of layers comprise a number of identical layers and the searchable parameters for such block are uniformly applied to the number of identical layers included in such block.

In some implementations, the one or more searchable parameters included in the sub-search space associated with at least one of the plurality of blocks comprise an operation to be performed by each of one or more layers included in the block.

In some implementations, a set of available operations for the searchable parameter of the operation to be performed comprise one or more of: a convolution; a depthwise convolution; an inverted bottleneck convolution; or a group convolution.

In some implementations, the one or more searchable parameters included in the sub-search space associated with at least one of the plurality of blocks comprise one or more of: a kernel size; a skip operation to be performed; or an output filter size.

In some implementations, all of the plurality of sub-search spaces share a same set of searchable parameters.

In some implementations, at least two of the plurality of sub-search spaces have different sets of searchable parameters associated therewith.

In some implementations, the method further comprises, for each iteration: measuring, by the one or more computing devices, one or more performance characteristics of the new network structure for the artificial neural network.

In some implementations, the method further comprises, for each iteration: determining, by the one or more computing devices, a reward to provide to a controller in a reinforcement learning scheme based at least in part on the one or more performance characteristics.

In some implementations, the one or more performance characteristics comprise a real-world latency associated with implementation of the new network structure on a real-world mobile device.

Another example aspect of the present disclosure is directed to a computing system, comprising: one or more processors; and one or more non-transitory computer-readable media that store instructions that, when executed by the one or more processors, cause the computing system to perform operations, the operations comprising: defining an initial network structure for an artificial neural network, the initial network structure comprising a plurality of blocks, wherein a plurality of sub-search spaces are respectively associated with the plurality of blocks, the sub-search space for each block having one or more searchable parameters associated therewith; and for each of a plurality of iterations: modifying at least one of the searchable parameters in the sub-search space associated with at least one of the plurality of blocks to generate a new network structure for the artificial neural network.

In some implementations, the plurality of sub-search spaces comprise a plurality of independent sub-search spaces such that modification of at least one of the searchable parameters in one of the sub-search spaces does not necessitate modification of the searchable parameters of any other of the sub-search spaces.

In some implementations, the one or more searchable parameters included in the sub-search space associated with at least one of the plurality of blocks comprise a number of layers included in the block.

In some implementations, the one or more searchable parameters for each block are uniformly applied to all layers included in such block.

Another example aspect of the present disclosure is directed to one or more non-transitory computer-readable media that store instructions that, when executed by one or more processors of a computing system, cause the computing system to perform operations, the operations comprising: defining, by one more computing devices, an initial network structure for an artificial neural network, the initial structure comprising a plurality of blocks, wherein a plurality of sub-search spaces are respectively associated with the plurality of blocks, the sub-search space for each block having a plurality of searchable parameters associated therewith, the plurality of searchable parameters for each block comprising at least a number of identical layers included in the block and an operation to be performed by each of the number of identical layers included in the block; and for each of a plurality of iterations: modifying, by one or more computing devices, at least one of the searchable parameters in the sub-search space associated with at least one of the plurality of blocks to generate a new network structure for the artificial neural network, wherein the number of identical layers included in at least one of the plurality of blocks comprises two or more identical layers.

In some implementations, the plurality of sub-search spaces comprise a plurality of independent sub-search spaces such that modification of at least one of the searchable parameters in one of the sub-search spaces does not necessitate modification of the searchable parameters of any other of the sub-search spaces.

In some implementations, a set of available operations for the searchable parameter of the operation to be performed by each of the number of identical layers comprise one or more of: a convolution; a depthwise convolution; a mobile inverted bottleneck convolution; or a group convolution.

In some implementations, the plurality of searchable parameters included in the sub-search space associated with at least one of the plurality of blocks additionally comprise one or more of: a kernel size; a skip operation to be performed; or an output filter size.

In some implementations, the plurality searchable parameters included in the sub-search space associated with at least one of the plurality of blocks additionally comprise an input size.

What is claimed is:

1. A computing system, comprising:
one or more processors; and
one or more non-transitory computer-readable media that store a machine-learned convolutional neural network and instructions that, when executed by the one or more processors, cause the computing system to employ the machine-learned convolutional neural network to process input image data to output an inference;
wherein the machine-learned convolutional neural network comprises a plurality of convolutional blocks arranged in a sequence one after the other, the plurality of convolutional blocks comprising:
a first convolutional block configured to receive an input and perform at least one depthwise separable convolution to produce a first output;
a second convolutional block configured to receive the first output of the first convolutional block and perform at least one inverted bottleneck convolution to produce a second output;
a third convolutional block configured to receive the second output of the second convolutional block and perform at least one inverted bottleneck convolution to produce a third output;
a fourth convolutional block configured to receive the third output of the third convolutional block and perform at least one inverted bottleneck convolution to produce a fourth output;
a fifth convolutional block configured to receive the fourth output of the fourth convolutional block and perform at least one inverted bottleneck convolution to produce a fifth;
a sixth convolutional block configured to receive the fifth output of the fifth convolutional block and perform at least one inverted bottleneck convolution to produce a sixth output; and
a seventh convolutional block configured to receive the sixth output of the sixth convolutional block and perform at least one inverted bottleneck convolution to produce a seventh output; and
wherein two or more of the first, second, third, fourth, fifth, sixth, or seventh convolutional blocks apply respective convolutional kernels that have different respective sizes.

2. The computing system of claim 1, wherein each of one or more layers of the first convolutional block applies a 3×3 convolutional kernel.

3. The computing system of claim 1, wherein the first convolutional block comprises a single layer.

4. The computing system of claim 1, wherein the first convolutional block does not include a skip connection.

5. The computing system of claim 1, wherein each of one or more layers of the second convolutional block applies a 3×3 convolutional kernel.

6. The computing system of claim 1, wherein the second convolutional block comprises one or both of: three identical layers, and one or more identity residual skip connections.

7. The computing system of claim 1, wherein each of one or more layers of the third convolutional block applies a 5×5 convolutional kernel.

8. The computing system of claim 1, wherein the third convolutional block comprises one or both of: three identical layers, and one or more identity residual skip connections.

9. The computing system of claim 1, wherein each of one or more layers of the fourth convolutional block applies a 5×5 convolutional kernel.

10. The computing system of claim 1, wherein the fourth convolutional block comprises one or both of: three identical layers, and one or more identity residual skip connections.

11. The computing system of claim 1, wherein each of one or more layers of the fifth convolutional block applies a 3×3 convolutional kernel.

12. The computing system of claim 1, wherein the fifth convolutional block comprises one or both of: two identical layers, and one or more identity residual skip connections.

13. The computing system of claim 1, wherein each of one or more layers of the sixth convolutional block applies a 5×5 convolutional kernel.

14. The computing system of claim 1, wherein the sixth convolutional block comprises one or both of: four identical layers, and one or more identity residual skip connections.

15. The computing system of claim 1, wherein each of one or more layers of the seventh convolutional block applies a 3×3 convolutional kernel.

16. The computing system of claim 1, wherein the seventh convolutional block comprises a single layer or the seventh convolutional block does not include any residual skip connections.

17. The computing system of claim 1, wherein the machine-learned convolutional neural network further comprises:
a fully connected layer configured to receive an output of the seventh convolutional block;
a pooling layer configured to receive an output of the fully connected layer; and
an output layer configured to receive an output of the pooling layer and output the inference.

18. The computing system of any claim 1, wherein the machine-learned convolutional neural network further comprises:
an initial convolutional layer configured to receive the input image data and to perform a convolution over the image data to produce an initial output, wherein the first convolutional block is configured to receive the initial output from the initial convolutional layer.

19. The computing system of claim 1, wherein one or more of the first, second, third, fourth, fifth, sixth, or seventh convolutional blocks apply a 5×5 convolutional kernel.

* * * * *